(12) United States Patent
Ozaki et al.

(10) Patent No.: US 9,077,231 B2
(45) Date of Patent: Jul. 7, 2015

(54) MOTOR

(71) Applicant: ASMO CO., LTD., Shizuoka-ken (JP)

(72) Inventors: Tomoaki Ozaki, Toyohashi (JP);
Hiroshi Kokubu, Kosai (JP); Nobuo Mizutani, Toyohashi (JP); Mitsuhiro Takada, Hamamatsu (JP)

(73) Assignee: Asmo Co., Ltd., Shizuoka-ken (JP)

( * ) Notice: Subject to any disclaimer, the term of this patent is extended or adjusted under 35 U.S.C. 154(b) by 254 days.

(21) Appl. No.: 13/867,540

(22) Filed: Apr. 22, 2013

(65) Prior Publication Data

US 2013/0285492 A1 Oct. 31, 2013

(51) Int. Cl.
  *H02K 11/00* (2006.01)

(52) U.S. Cl.
  CPC ........ *H02K 11/0084* (2013.01); *H02K 11/0021* (2013.01)

(58) Field of Classification Search
  USPC .................................. 310/68 B, 71, 98–99
  See application file for complete search history.

(56) References Cited

U.S. PATENT DOCUMENTS

| | | |
|---|---|---|
| 2005/0012412 A1 | 1/2005 | Buss et al. |
| 2005/0184606 A1* | 8/2005 | Kokubu et al. ............. 310/75 R |
| 2006/0113852 A1* | 6/2006 | Adachi et al. ................... 310/71 |
| 2007/0103013 A1* | 5/2007 | Sakohira et al. ................ 310/71 |
| 2008/0203833 A1* | 8/2008 | Mizutani ......................... 310/71 |
| 2010/0164333 A1* | 7/2010 | Uchimura et al. .......... 310/68 B |
| 2010/0176696 A1* | 7/2010 | Mizutani et al. ............ 310/68 B |
| 2012/0025643 A1* | 2/2012 | Shibusawa et al. ............ 310/71 |
| 2012/0112579 A1* | 5/2012 | Kokubu ......................... 310/71 |

FOREIGN PATENT DOCUMENTS

WO 03/071073 A1 8/2003

* cited by examiner

*Primary Examiner* — Thanh Lam
(74) *Attorney, Agent, or Firm* — Caesar Rivise, PC

(57) ABSTRACT

The axial direction of a worm wheel is defined as a motor short-transverse direction, and a plane orthogonal to the motor short-transverse direction is defined as a motor flat plane. An imaginary plane contacting a first end of a sensor magnet in a motor short-transverse direction and parallel with the flat plane is defined as a first imaginary plane. An imaginary plane contacting a second end of the sensor magnet in the motor short-transverse direction and parallel with the flat plane is defined as a second imaginary plane. A control circuit board is provided with a rotation detecting element that detects rotation of the rotary shaft of the motor. The control circuit board is arranged to be parallel with or inclined relative to the flat plane, and is provided between the first and second imaginary planes.

11 Claims, 12 Drawing Sheets

MOTOR

BACKGROUND

The present disclosure relates to a motor used as, for example, a drive source of a vehicular power window device.

The motor disclosed in International Patent Publication No. WO 03/71073 includes a motor unit having a rotary shaft, a speed reduction unit, which is attached to the output end of the motor unit, reduces the rotation speed of the rotary shaft, and outputs the decelerated rotation, a sensor magnet, which rotates integrally with the rotary shaft, and a connector module, which electrically connects the motor unit with the outside. The speed reduction unit includes a speed reduction mechanism having a worm shaft, which is arranged to be coaxial with the rotary shaft and integrally rotational with the rotary shaft, and a worm wheel meshed with the worm shaft. The motor unit is attached to a gear housing. The gear housing accommodates the speed reduction mechanism, and is provided with the connector module. The connector module includes a connector that is electrically connected with the outside and a tabular board provided with a rotation detecting element like a Hall Effect IC that detects rotation of the sensor magnet. That is, the connector module includes a control circuit component that controls the rotation of the rotary shaft.

Recently, the amount of electrical components mounted on the board for a control circuit has been increasing together with the advancement of a multifunctional motor control. Hence, the size of the board increases. This leads to increase in the size of the gear housing accommodating the board, and thus the size of motor.

In particular, according to the motor disclosed in International Patent Publication No. WO 03/71073, due to the limited installation space, a reduction in the thickness direction (short-transverse direction) along the axis of the worm wheel is necessary. A structure in which the board is parallel with the flat surface of the motor like the above-described motor, i.e., a structure in which the board is parallel with the flat plane orthogonal to the short-transverse direction, it is advantageous for size reduction in the short-transverse direction of the motor. According to this motor, however, since the board is arranged to face the sensor magnet in the motor short-transverse direction, the size of the motor increases in the short-transverse direction by a distance corresponding to the board.

SUMMARY

An object of the present disclosure is to provide a motor that prevents its size from being increasing.

In accordance with one aspect of the present disclosure, a motor includes a motor unit, a speed reduction mechanism, a sensor magnet, and a connector module. The motor unit includes a rotary shaft. The speed reduction mechanism includes a worm shaft and a worm wheel. The worm shaft is arranged coaxially with the rotary shaft and is integrally rotational with the rotary shaft, and the worm wheel is meshed with the worm shaft. The sensor magnet rotates integrally with the rotary shaft. The connector module includes a connector portion for establishing an electrical connection between the outside and the motor unit and a tabular control circuit board provided with a rotation detecting element that detects rotation of the sensor magnet. An axial direction of the worm wheel is defined as a motor short-transverse direction. A plane orthogonal to the motor short-transverse direction is defined as a flat plane of the motor. The sensor magnet has a first end in the motor short-transverse direction and a second end opposite to the first end. An imaginary plane contacting the first end and being parallel with the flat plane is defined as a first imaginary plane. An imaginary plane contacting the second end and being parallel with the flat plane is defined as a second imaginary plane. The control circuit board is arranged to be parallel with or inclined relative to the flat plane and is located between the first and second imaginary planes.

According to this aspect, the control circuit board is provided between the first imaginary plane and the second imaginary plane, which are parallel with the flat surface of the motor and hold therebetween the sensor magnet. Moreover, the control circuit board is parallel with or tilted relative to the flat plane of the motor. Accordingly, the control circuit board is within the width of the sensor magnet in the short-transverse direction of the motor, and thus the size of the motor is reduced in the short-transverse direction.

According to one form of the disclosure, the rotation detecting element is located between the first and second imaginary planes.

According to this aspect, not only the control circuit board but also the rotation detecting element are within the width of the sensor magnet in the short-transverse direction of the motor. This enables a further reduction of size of the motor in the short-transverse direction.

According to one form of the present disclosure, the control circuit board is located at a position shifted in the motor short-transverse direction relative to an imaginary straight line that is parallel with the flat plane and intersects an axis of the rotary shaft at right angle. The rotation detecting element is located on a side of the control circuit board that faces the imaginary straight line.

According to this aspect, the rotation detecting element is brought closer to the sensor magnet, and thus the rotation detecting element is allowed to readily detect magnetic flux from the sensor magnet.

According to one form of the present disclosure, the rotation detecting element is mounted on the control circuit board by the surface-mount technology.

According to this aspect, the rotation detecting element is mounted on the control circuit board by the surface-mount technology. This contributes to space saving.

According to one form of the present disclosure, a tangent line of an outer circumference of the sensor magnet orthogonal to both first and second imaginary planes is defined as a sensor magnet tangent line. When the sensor magnet tangent line traverses the control circuit board as viewed along the axis of the rotary shaft, an end portion of the control circuit board is located on a side of the sensor magnet tangent line that corresponds to the sensor-magnet.

According to this aspect, the control circuit board is located between the first imaginary plane and the second imaginary plane. This accomplishes a reduction in the size of the motor in the short-transverse direction, while at the same time, the control circuit board can be arranged closer to the sensor magnet. As a result, the distance between the rotation detecting element, which is mounted on the control circuit board by the surface-mount technology, and the sensor magnet is shortened. The shortening of the distance between the rotation detecting element and the sensor magnet allows the magnetic force of the sensor magnet to be reduced without deteriorating the rotation detecting performance. This contributes to cost reduction.

According to one form of the present disclosure, the connector module includes a second board that is parallel with the control circuit board and faces the control circuit board in the motor short-transverse direction, and the control circuit board and the second board are electrically connected to each other. The second board has on it a switch circuit that generates a drive current to be supplied to the motor unit, and the control circuit board has on it a control circuit that controls the switch circuit.

According to this aspect, the control circuit and the switch circuit are provided on separate boards, and thus the planar area of each board is reduced. Since such two boards are arranged to face each other, an increase in size of the connector module in a board planar direction is suppressed.

According to one form of the present disclosure, the switch circuit is a relay circuit, and a clearance between the control circuit board and the second board in the motor short-transverse direction is set to be smaller than a height dimension of the relay circuit.

According to this aspect, the installation space of the control circuit board and the second board (including the relay circuit) is minimized in the motor short-transverse direction. Thus an increase in the size of the motor in the short-transverse direction is limited although a structure is employed in which the two boards are arranged side by side in the motor short-transverse direction.

According to one form of the present disclosure, the motor unit further includes a gear housing and a second board. The gear housing is assembled with the motor unit and accommodates the speed reduction mechanism, which outputs rotation of the rotary shaft after reducing the speed of the rotation. The second board faces the control circuit board in a surface-to-surface manner and is electrically connected with the control circuit board. The connector module is attached to the gear housing. Electrical components are provided on the facing surfaces of the control circuit board and the second board. The electrical component on the control circuit board and the electrical component on the second board are shifted in a board planar direction so as not to interfere with each other.

According to this aspect, the electrical components are separately provided for the control circuit board and the second board, and thus the area of each board can be reduced. Even if the clearance between the control circuit board and the second board facing each other in a surface-to-surface manner is reduced, the electrical components of the respective boards are structured not to interfere with each other. Accordingly, by narrowing down the clearance between the control circuit board and the second board, an increase in size of the motor is suppressed.

According to one form of the present disclosure, an insertion portion is formed in at least one of the control circuit board and the second board, and the insertion portion receives in it the electrical component provided on the other board.

According to this aspect, the structure is employed in which the board and the electrical component do not interfere with each other although the clearance between the control circuit board and the second board is reduced.

According to one form of the present disclosure, the gear housing has a flat shape that is thin in the motor short-transverse direction, and the control circuit board and the second board are arranged to face each other in the motor short-transverse direction.

According to this aspect, the control circuit board and the second board are arranged in conformity with the flat shape of a gear housing. Accordingly, an increase in size of the gear housing in the short-transverse direction is suppressed while maintaining the area of each board.

According to one form of the present disclosure, a width of the second board in a board planar direction is within a width of the control circuit board in a board planar direction as viewed in an attaching direction of the connector module.

According to this aspect, the size of a connector module (connector housing) in the board planar direction of the control circuit board can be set in accordance with the width of the control circuit board regardless of the width of the second board. Accordingly, an increase in size of the connector module in the board planar direction of the control circuit board can be suppressed, while at the same time, the control circuit board and the second board are arranged in the connector module. Moreover, when a low-cost structure omitting the second board from the connector module is employed, no wasted space of the control circuit board in the board planar direction is formed in the connector module (connector housing), contributing to space saving in the connector module. Furthermore, when the second board is added to the low-cost structure, it can be accepted without changing the size of the connector module in the board planar direction of the control circuit board.

Other aspects and advantages of the discloser will become apparent from the following description, taken in conjunction with the accompanying drawings, illustrating by way of example the principles of the disclosure.

BRIEF DESCRIPTION OF THE DRAWINGS

The features of the present disclosure that are believed to be novel are set forth with particularity in the appended claims. The disclosure, together with objects and advantages thereof, may best be understood by reference to the following description of the presently preferred embodiments together with the accompanying drawings in which:

FIG. 4(*b*) is an explanatory diagram illustrating how the Hall Effect IC detects rotation;

DESCRIPTION OF THE PREFERRED EMBODIMENTS

First Embodiment

Hereinafter, a preferred embodiment according to the present disclosure will be described.

Figure 1:
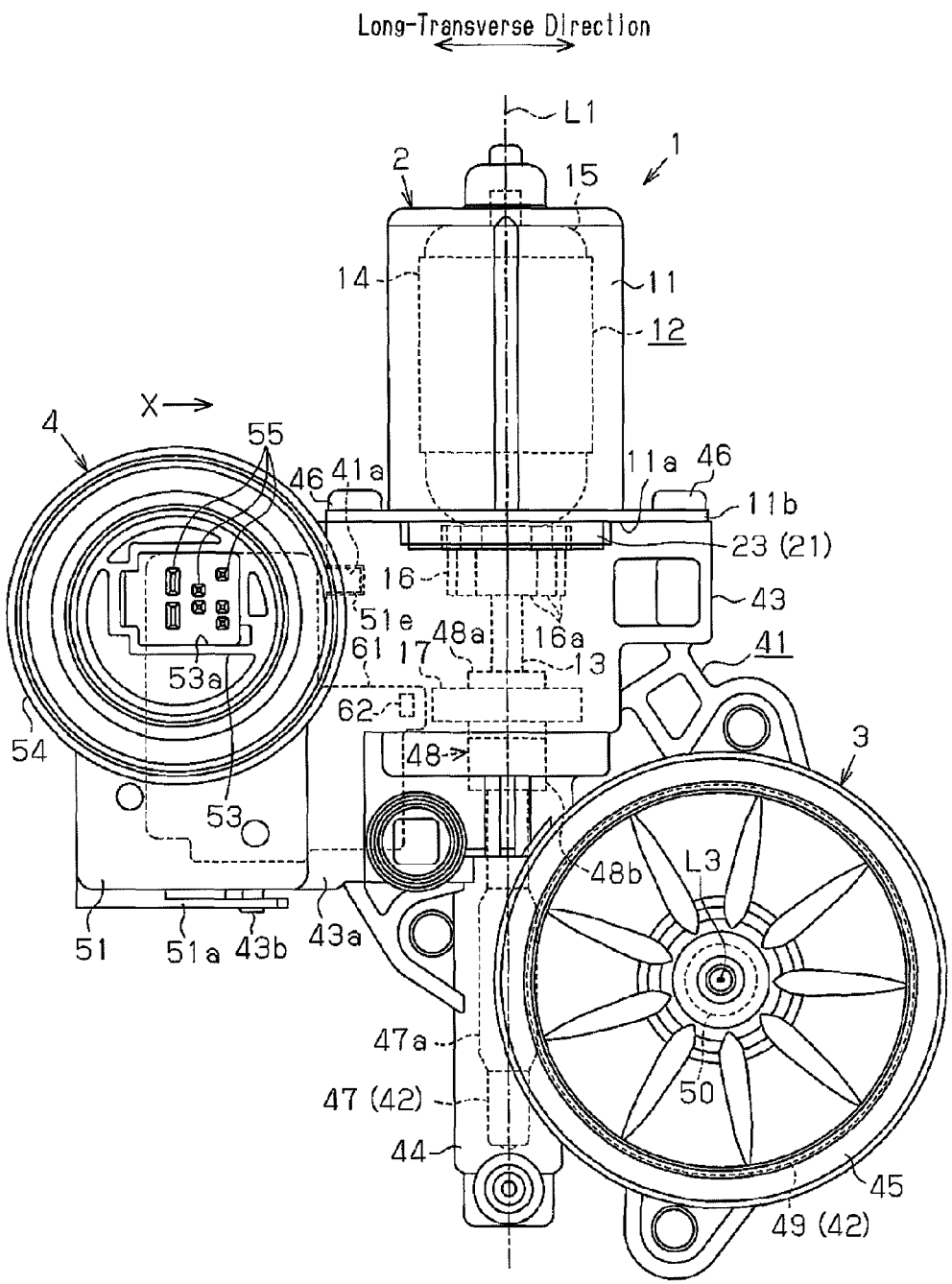
FIG. 1 is a side view illustrating a motor according to a first embodiment.

A motor 1 of the present embodiment illustrated in FIG. 1 is used as a drive source of a power window device that lifts up and lowers a window glass of a vehicle by electric power. The motor 1 includes a motor unit 2 located in the upper part of FIG. 1, a speed reduction unit 3 provided at the output side of the motor unit 2, i.e., in the lower part of the FIG. 1, and a connector module 4 assembled at a side of the speed reduction unit 3, i.e., in the left of FIG. 1. The motor 1 is in a flat shape as a whole, and has a thin thickness in a direction orthogonal to the axis (axis L1 of rotary shaft 13) of the motor unit 2 (a direction orthogonal to the sheet of FIG. 1). The term in-plane direction means the motor long-transverse direction when the motor 1 is viewed from the axial direction, i.e., the horizontal direction in FIG. 1, and is referred to as a motor long-transverse direction in the following description. The term thickness direction means the motor short-transverse direction, i.e., the direction orthogonal to the sheet of FIG. 1, and is referred to as a motor short-transverse direction in the following description. That is, the axial direction, in-plane direction and thickness direction of the motor 1 intersect with each other at right angle.

Structure of Motor Unit

The motor unit 2 has a yoke housing 11 (in the following description, referred to as a yoke 11 for the purpose of simplification) formed in a cylindrical shape with a closed end, and an end thereof opposite to the output side, i.e., an upper end in FIG. 1 is closed. The yoke 11 has an output-side end 11a opened in the axial direction of the motor 1 (downward direction in FIG. 1). A flange 11b extending outwardly in the radial direction is formed at the output-side end 11a. The yoke 11 has an inner circumference to which magnets (not shown) are attached, and an armature 12 is located inward of the magnets.

The armature 12 includes a columnar rotary shaft 13 arranged at the center of the yoke 11 in the radial direction, an armature core 14 fastened to the rotary shaft 13 to be integrally rotational with the rotary shaft 13, a coil 15 wound around the armature core 14, and a commutator 16 fastened to a part the rotary shaft 13 that is closer to the tip than the armature core 14, i.e., the bottom-end in FIG. 1.

The rotary shaft 13 has a basal end (upper end in FIG. 1) supported by an unillustrated bearing provided at the bottom center of the yoke 11. The tip end of the rotary shaft 13 protrudes from the opening of the output-side end 11a of the yoke 11 to the outside. The armature core 14 is fastened to a part of the rotary shaft 13 located inside the yoke 11, and faces the above-described magnets (not shown) in the radial direction.

The commutator 16 is fitted about and fastened to a portion of the rotary shaft 13 protruding outwardly from the yoke 11. Hence, the commutator 16 is located outside the yoke 11, and is structured to be integrally rotational with the rotary shaft 13. This commutator 16 is in a cylindrical shape, and a plurality of segments 16a are arranged side by side on the outer circumference of the commutator 16 to be spaced from each other in the circumferential direction. Some of or all of the segments 16a are electrically connected to the coil 15. That is, power is supplied to the coil 15 through the segments 16a of the commutator 16.

Figure 3:
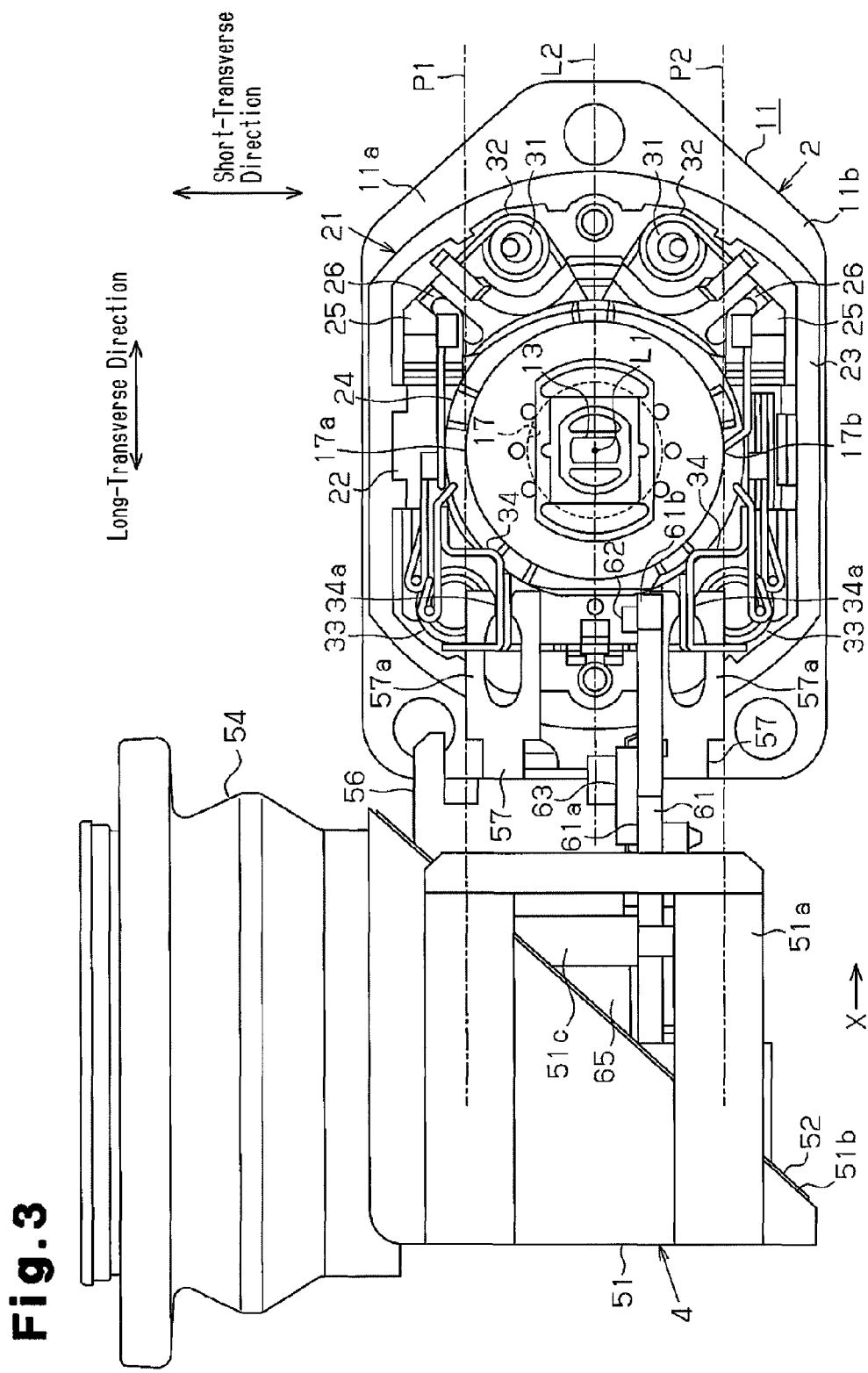
FIG. 3 is a plan view illustrating a motor unit and a connector module in FIG. 1 as viewed from the direction of a gear housing.

As illustrated in FIG. 3, the motor unit 2 includes a plastic brush holder 21 provided at the output-side end 11a of the yoke 11. The brush holder 21 includes a tabular holder base 22 located outward of the output-side end 11a of the yoke 11. The holder base 22 is formed such that the size thereof in the direction orthogonal to the axis is slightly larger than the opening of the output-side end 11a. A sealing member 23 is provided at the outer edge of the holder base 22, and the sealing member 23 ensures a liquid-tightness between a gear housing 41 of the speed reduction unit 3, which will be discussed below, and the yoke 11. The sealing member 23 is formed of, for example, elastomer.

A commutator accommodating portion 24 protruding in the axial direction toward the opposite side of the yoke is formed at the center portion of the holder base 22 integrally with the holder base 22. The commutator 16 is located in the commutator accommodating portion 24. Hence, the outer circumference of the commutator 16 and the end thereof in the axial direction opposite to the yoke are covered by the commutator accommodating portion 24. The rotary shaft 13 has its tip end protruding from the commutator accommodating portion 24.

Brush accommodating portions 25 protruding outwardly in the radial direction are formed integrally with the commutator accommodating portion 24. As illustrated in FIG. 3, an imaginary straight line parallel with the long-transverse direction of the motor 1 and orthogonal to the axis L1 of the rotary shaft 13 is defined as an imaginary straight line L2. The pair of brush accommodating portions 25 is arranged to be symmetrical with each other with respect to the imaginary straight line L2. Each brush accommodating portion 25 is also integral with the holder base 22. Each brush accommodating portion 25 is in communication with the interior of the commutator accommodating portion 24, and a power feeding brush 26 is accommodated in each brush accommodating portion 25 to be movable in the radial direction. A tip of each power feeding brush 26, i.e., the internal end thereof in the radial direction is structured to abut against the outer circumference of the commutator 16 in the commutator accommodating portion 24. The commutator accommodating portion 24 suppresses shattering of brush powder produced by the power feeding brush 26 sliding against the commutator 16 and being scraped.

A pair of supporting pillars 31 protruding toward the opposite side to the yoke (toward the gear housing 41) in the axial direction from the holder base 22 are formed in a space in the circumferential direction between the pair of brush accommodating portions 25. The supporting pillars 31 are formed to be symmetrical with respect to the imaginary straight line L2 like the brush accommodating portions 25. Each supporting pillar 31 has a circular cross section, and a coil part of a torsion spring 32 that pushes the power feeding brush 26 inwardly in the radial direction (i.e., toward the commutator 16) is fitted about to each supporting pillar 31, and is held by the supporting pillar 31. Each supporting pillar 31 abuts against the gear housing 41 in the axial direction and in the radial direction, thereby determining the position relative to the gear housing 41 in the axial direction and in the radial direction.

In the brush holder 21, the position of the brush accommodating portion 25 and the supporting pillar 31 are defined a first end in the long-transverse direction, and an end of the brush holder 21 that is opposite to the first end is defined as a second end in the long-transverse direction. A pair of choke coils 33 and a pair of power feeding terminals 34 are provided at the second end. The pair of choke coils 33 is structured to be symmetrical with each other with respect to the imaginary straight line L2. The pair of power feeding terminals 34 is structured to be symmetrical with each other with respect to the imaginary straight line L2. Each power feeding terminal 34 is electrically connected to the corresponding power feeding brush 26 through the choke coil 33. The choke coils 33 are noise eliminators for eliminating noises contained in power supplied to the armature 12. The power feeding terminal 34 is formed of a metal plate, and includes an insertion portion 34a connected to a connector-side terminal 57, which will be discussed below. The insertion portion 34a is formed in a planar shape that is parallel with the in-plane direction (a plane orthogonal to the motor short-transverse direction) of the motor 1.

Structure of Speed Reduction Unit

As illustrated in FIG. 1, the speed reduction unit 3 includes the gear housing 41, and a speed reduction mechanism 42 accommodated in the gear housing 41. The gear housing 41 includes a holder accommodating portion 43 fastened to the flange 11b of the yoke 11, and a worm shaft accommodating portion 44, which extends from the holder accommodating portion 43 in the direction opposite to the yoke 11 along the axis L1 of the rotary shaft 13. Moreover, the gear housing 41 includes a wheel accommodating portion 45 formed to extend from the worm shaft accommodating portion 44 in the motor long-transverse direction, i.e., rightward in FIG. 1. Since the motor 1 is flat, the gear housing 41 is also flat, and the long-transverse direction of the motor 1 is also the long-transverse of the gear housing 41. That is, the long-transverse direction of the gear housing 41 is the horizontal direction in FIG. 1, and the short-transverse direction of the motor 1 is the short-transverse direction of the gear housing 41.

The holder accommodating portion 43 abutting against the flange 11b in the axial direction and is fastened to the flange 11b by a plurality of screws 46, so that the gear housing 41 is fastened to the yoke 11. A tip end portion of the rotary shaft 13 is located in the interior of the holder accommodating portion 43, and the commutator 16 is also located in the holder accommodating portion 43. Moreover, a portion of the brush holder 21 protruding from the output-side end 11a of the yoke 11 to the outside, e.g., the commutator accommodating portion 24, the brush accommodating portion 25, and each power feeding terminal 34 are located in the interior of the holder accommodating portion 43.

A worm shaft 47 in a substantially columnar shape is accommodated in the interior of the worm shaft accommodating portion 44. A worm 47a in a threaded shape is formed at a substantial center of the worm shaft 47 in the axial direction. The worm shaft 47 is arranged to be coaxial with the rotary shaft 13, i.e., arranged to have respective center axes matching with each other, and is rotationally supported in the worm shaft accommodating portion 44.

The worm shaft 47 and the rotary shaft 13 are coupled to each other via a clutch 48 located in the holder accommodating portion 43. The clutch 48 includes a driving rotator 48a fastened to a tip of the rotary shaft 13, and a driven rotator 48b, which is coupled to the driving rotator 48a to rotate integrally therewith. The driven rotator 48b is fastened to an end (in FIG. 1, upper end) of the worm shaft 47 in the axial direction. The clutch 48 operates to transmit rotation of the driving rotator 48a to the driven rotator 48b, but not to transmit rotational force of the driven rotator 48b to the driving rotator 48a. That is, the clutch 48 outputs rotational input from the rotary shaft 13 to the worm shaft 47, but blocks rotational input from the worm shaft 47.

The internal space of the wheel accommodating portion 45 is in communication with the internal space of the worm shaft accommodating portion 44. A worm wheel 49 in a disc shape meshed with the worm 47a is accommodated in the interior of the wheel accommodating portion 45. The worm shaft 47 and the worm wheel 49 construct the speed reduction mechanism 42. The worm wheel 49 is arranged such that the rotation axis L3 is parallel with the motor short-transverse direction. The worm wheel 49 is rotationally supported by the wheel accommodating portion 45. The worm wheel 49 is formed in a flat disc shape that is thin in the direction of the rotation axis L3. An output shaft 50, which extends in the axial direction of the worm wheel 49, is provided at the center of the worm wheel 49 to be integrally rotational with the worm wheel 49. A tip of the output shaft 50 protrudes to the outside of the gear housing 41, and a window glass of the vehicle is coupled to the tip of the output shaft 50 through an unillustrated window regulator.

Figure 2:
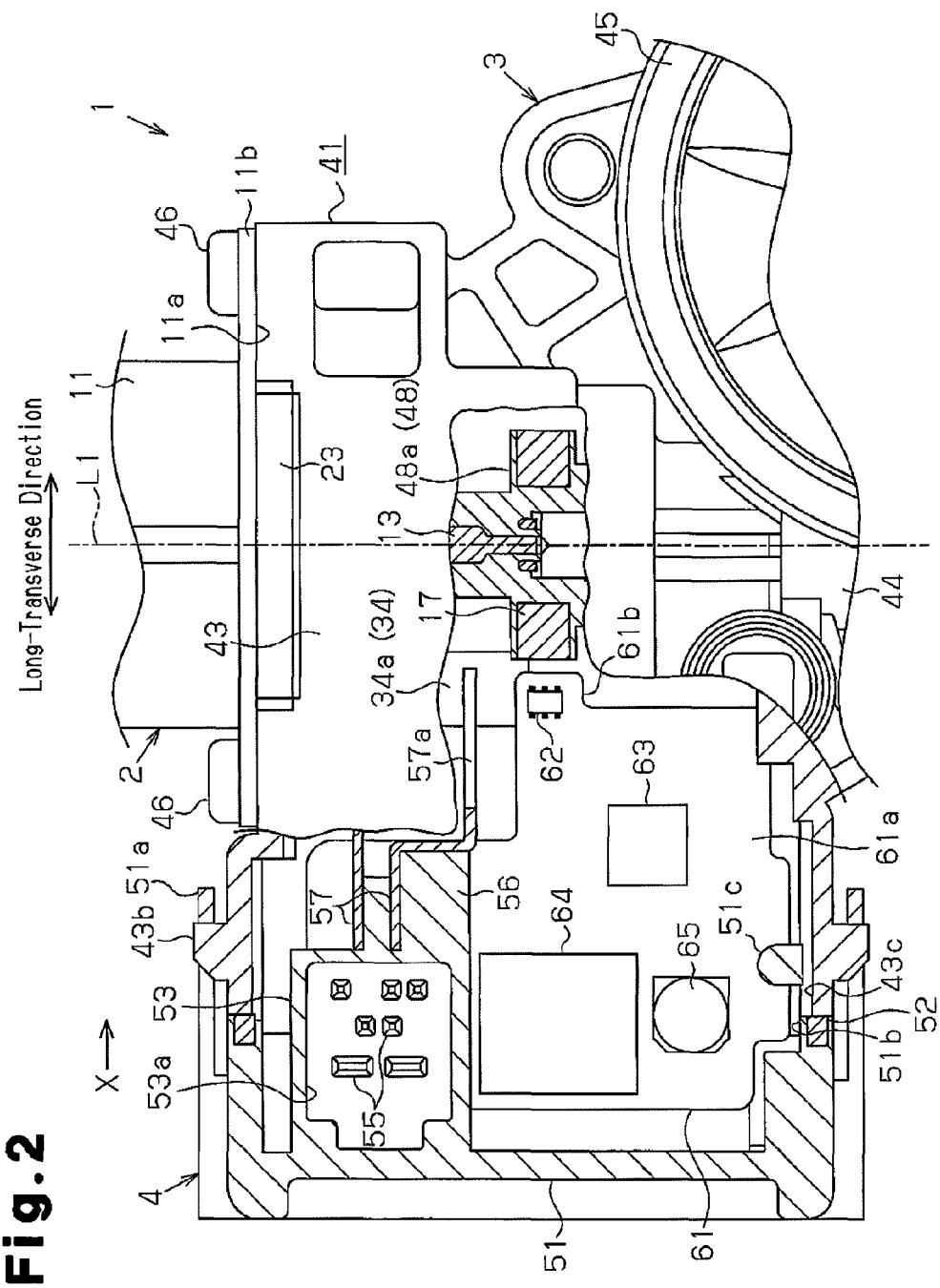
FIG. 2 is a partial cross-sectional view of the motor in FIG. 1.

The sensor magnet 17 in an annular shape is fastened to the driving rotator 48a of the clutch 48. As illustrated in FIG. 2, the sensor magnet 17 is coaxial with the axis L1 of the rotary shaft 13, and has a rectangular cross section in the radial direction. The sensor magnet 17 is structured to be integrally rotational with the rotary shaft 13 and the driving rotator 48a.

Structure of Connector

As illustrated in FIG. 1, a connector attaching portion 43a extending toward one side in the motor long-transverse direction (in the direction opposite to the wheel accommodating portion, i.e., toward the connector module 4) is formed at the holder accommodating portion 43. The connector module 4 is attached to the connector attaching portion 43a. The connector module 4 is structured to protrude toward one side in the motor long-transverse direction (direction opposite to the direction in which the wheel accommodating portion 45 extends) from the central axis of the motor 1, i.e., the axis L1 of the rotary shaft 13.

As illustrated in FIGS. 1 and 2, the connector module 4 includes a plastic connector housing 51 attached to the connector attaching portion 43a. The connector housing 51 has latching pieces 51a formed at both ends in the motor axial direction, and each latching piece 51a is engaged with a latching-piece catcher 43b of the connector attaching portion 43a. The engagement of the latching piece 51a with the latching-piece catchers 43b allows the connector housing 51 to be fastened to the gear housing 41. When attaching the connector module 4, the connector module 4 is attached to the connector attaching portion 43a in the long-transverse direction of the motor 1, i.e., an attaching direction X. The attaching direction X extends from the left in FIG. 1 to the right.

As illustrated in FIG. 2, an opening 51b opened toward the gear housing 41 is formed in the connector housing 51. As illustrated in FIG. 2, an opening 43c opened toward the connector module 4 is formed in the connector attaching portion 43a as illustrated in FIG. 1. Respective edges of the openings 51b and 43c abut against each other via a sealing member 52. Accordingly, the space between the openings 51b and 43c are air-tightly sealed and closed. As illustrated in FIG. 3, an end face of the opening 51b of the connector housing 51 is inclined relative to the motor short-transverse direction. That is, the motor 1 is structured such that the boundary face between the connector attaching portion 43a and the connector housing 51 is inclined relative to the motor short-transverse direction.

As illustrated in FIG. 1, an external connection portion 53 is formed at a side face of the connector housing 51 in the motor short-transverse direction to extend in the motor short-transverse direction. As illustrated in FIG. 2, the external connection portion 53 is provided with a receptacle 53a that extends up to the interior of the connector housing 51. The receptacle 53a is recessed in the motor short-transverse direction, and has an internal surface that conforms to the external shape of an unillustrated external connector to be plugged in the receptacle 53a. As illustrated in FIGS. 1 and 3, the external connection portion 53 has an external surface surrounded by a substantially cylindrical connector boot 54. The connector boot 54 prevents entrance of water into the receptacle 53a. The connector boot 54 in the present embodiment is formed of elastomer and is formed integrally with the connector housing 51.

As illustrated in FIG. 3, a tabular control circuit board 61 is fastened to the connector housing 51. The control circuit board 61 is provided on the connector housing 51 such that a part of the board 61 protrudes from the opening 51b. A positioning member 51c extending in the motor short-transverse direction is formed on the connector housing 51. The position of the control circuit board 61 is determined in the short-transverse, axial and long-transverse directions of the motor 1 by the positioning member 51c. The control circuit board 61 is arranged to have a surface orthogonal to the motor short-transverse direction. In other words, the control circuit board 61 is provided such that the surface thereof is parallel with the flat plane of the motor 1. This ensures the planar area of the control circuit board 61, and enables in the size of the motor to be reduced in the short-transverse direction.

As illustrated in FIG. 3, the control circuit board 61 is located between a first imaginary plane P1 and a second imaginary plane P2, which are defined based on the shape and size of the sensor magnet 17, e.g., the external diameter of the sensor magnet 17. In other words, the first imaginary plane P1 is a plane parallel with the motor flat plane (an imaginary plane orthogonal to the motor short-transverse direction) and contacting a first end 17a of the sensor magnet 17 in the motor short-transverse direction. The second imaginary plane P2 is a plane parallel with the motor flat plane and contacting a second end 17b of the sensor magnet 17 in the motor short-transverse direction. The control circuit board 61 is provided between the first imaginary plane P1 and the second imaginary plane P2 to be parallel with the motor flat plane, so that the control circuit board 61 is within the width of the sensor magnet 17 in the motor short-transverse direction. As a result, the size of the motor 1 is reduced in the motor short-transverse direction.

As illustrated in FIG. 3, the imaginary straight line L2 is parallel with the motor long-transverse direction and orthogonal to the axis L1 of the rotary shaft 13. The control circuit board 61 is provided at a position (offset position) shifted in the motor short-transverse direction relative to the imaginary straight line L2. That is, the control circuit board 61 is located between either one of the first and second imaginary planes P1 and P2 (in the present embodiment, second imaginary plane P2) and the imaginary straight line L2.

As illustrated in FIG. 1, a part of the control circuit board 61 extends to face the external connection portion 53 in the motor short-transverse direction. A plurality of connector terminals 55 are embedded in the external connection portion 53 by insert molding. A first end of each connector terminal 55 is connected to the control circuit board 61, while a second end of each connector terminal 55 protrudes in the internal space of the receptacle 53a of the external connection portion 53. The second end of each connector terminal 55 is connected to an external connector plugged in the receptacle 53a. Input/output of electric signals relative to the motor 1 and power supply thereto are carried out through the external connector. That is, the external connection portion 53 and the connector terminals 55 form a connector.

As illustrated in FIGS. 2 and 3, a Hall Effect IC 62 as a rotation detecting element, a control circuit 63, a relay circuit 64 (a switch circuit) as a drive circuit, and a capacitor 65 as a noise eliminator are mounted on a surface 61a (the surface facing the imaginary straight line L2) of the control circuit board 61 by the surface-mount technology. As illustrated in FIG. 2, the relay circuit 64 and the capacitor 65 are located in a space formed downward the external connection portion 53 in the axial direction. An extended board portion 61b is formed at a portion of the control circuit board 61 that is the same position as that of the sensor magnet 17 in the motor axial direction in the control circuit board 61. The extended board portion 61b extends toward the sensor magnet 17 in the motor long-transverse direction, and has a tip facing the outer circumference of the sensor magnet 17 in the motor long-transverse direction. The Hall Effect IC 62 is provided at the extended board portion 61b. That is, the extended board portion 61b is a portion of the control circuit board 61 formed to extended such that the Hall Effect IC 62 is located near the sensor magnet 17.

As illustrated in FIG. 2, the Hall Effect IC 62 is provided at the same position as that of the sensor magnet 17 in the motor axial direction. As illustrated in FIG. 3, the Hall Effect IC 62 is mounted on a surface of the control circuit board 61 (surface 61a) facing the imaginary straight line L2. That is, the Hall Effect IC 62 is provided between the control circuit board 61 and the imaginary straight line L2, and the control circuit board 61 is not present between the Hall Effect IC 62 and the sensor magnet 17. Accordingly, the Hall Effect IC 62 is structured to be close to the sensor magnet 17. According to the present embodiment, since the control circuit board 61 and the sensor magnet 17 are in the above-described positional relationship, the surface (a surface parallel with the surface 61a of the control circuit board 61) of the Hall Effect IC 62 mounted on the control circuit board 61 by the surface-mount technology is substantially orthogonal to the rotation direction of the rotary shaft 13. That is, a tangent line of a circle passing through the surface of the Hall Effect IC 62 and around the axis L1 of the rotary shaft 13 is slightly inclined relative to the surface of the Hall Effect IC 62 or intersects therewith at right angle.

As illustrated in FIG. 3, a terminal holder 56 is formed at the connector housing 51, and extends in the motor long-transverse direction (the attaching direction X of the connector module 4) from the external connection portion 53. The terminal holder 56 protrudes from an end face of the opening 51b toward the rotary shaft 13. The terminal holder 56 has a press-fit portion 51e (see FIG. 1) protrudes in the attaching direction X of the connector module 4 to determine the position of the terminal holder 56 relative to the connector attaching portion 43a of the gear housing 41.

As illustrated in FIGS. 2 and 3, a pair of connector-side terminals 57 (tuning-fork terminals) are fastened to the terminal holder 56. Each connector-side terminal 57 is connected to the surface 61a of the control circuit board 61. Each connector-side terminal 57 is bent in a predetermined shape, and has a branched portion 57a formed at the tip of each connector-side terminal 57 and extending in the motor long-transverse direction toward the rotary shaft 13. The branched portions 57a of the respective connector-side terminals 57 are provided at the same location in the axial direction, and are arranged side by side in the motor short-transverse direction.

As illustrated in FIG. 3, an insertion portion 34a of the power feeding terminal 34 located in the gear housing 41 is fitted with the branched portion 57a of each connector-side terminal 57. The branched portion 57a holds the insertion portion 34a in the motor short-transverse direction by its own elastic force. Accordingly, each connector-side terminal 57 and each power feeding terminal 34 are electrically connected to each other. The connector module 4 is attached to the connector attaching portion 43a in the attaching direction X, while at the same time, the insertion portion 34a is fitted with the branched portion 57a of each connector-side terminal 57. The control circuit board 61 is located between the branched portions 57a (more specifically, the connection portions each between the branched portion 57a and the insertion portion 34a) as viewed in the motor axial direction.

Next, a description will be given of attachment of the connector module 4.

When the connector module 4 is attached to the connector attaching portion 43a of the gear housing 41 in the motor long-transverse direction (attaching direction X), first, the press-fit portion 51e at the connector-module-4 illustrated in FIG. 1 is press-fitted in a press-fit hole 41a formed inward of the connector attaching portion 43a as a press-fit target portion. Accordingly, the position of the connector module 4 is determined relative to the connector attaching portion 43a. At this time, the insertion portion 34a of the power feeding terminal 34 illustrated in FIG. 3 is not fitted with the branched portion 57a of the connector-side terminal 57, and the latching piece 51a of the connector housing 51 illustrated in FIG. 2 is not latched with the latching-piece catcher 43b of the connector attaching portion 43a.

Thereafter, when the connector module 4 is further pushed in the attaching direction X, the insertion portion 34a of the power feeding terminal 34 is fitted in the branched portion 57a of each connector-side terminal 57. Accordingly, the branched portions 57a hold the insertion portion 34a in the motor thickness direction by its own elastic force, and thus each connector-side terminal 57 is electrically connected with each power feeding terminal 34. At this time, the latching piece 51a is not latched with the latching-piece catcher 43b, but the press-fit portion 51e is pushed in the press-fit hole 41a further in the attaching direction X.

As described above, after the position of the connector module 4 relative to the connector attaching portion 43a is determined by press-fitting the press-fit portion 51e into the press-fit hole 41a, the connector-side terminal 57 and the power feeding terminal 34 elastically contact each other, and thus being electrically connected to each other. Hence, the connector module 4 is prevented from displaced relative to the gear housing 41, and a mutual connection failure between the connector-side terminal 57 and the power feeding terminal 34 is prevented.

After the connector-side terminal 57 and the power feeding terminal 34 are connected with each other, each latching piece 51a of the connector housing 51 is elastically latched with each latching-piece catcher 43b of the gear housing 41 when the connector module 4 is further pushed in the attaching direction X. Accordingly, the connector housing 51 is fastened to the gear housing 41. At this time, the press-fit portion 51e illustrated in FIG. 1 is further pushed in the press-fit hole 41a in the attaching direction X, and the branched portion 57a of each connector-side terminal 57 is further pushed in the insertion portion 34a of the power feeding terminal 34 in the attaching direction X.

Next, operation of the present embodiment will be described.

When power is supplied from the external connector plugged in the receptacle 53a of the external connection portion 53 to the armature 12 through the connector terminal 55, the control circuit board 61, the connector-side terminal 57, and the power feeding terminal 34 of the brush holder 21, the armature 12 (rotary shaft 13) is rotated. When the armature 12 is being rotated, the sensor magnet 17 rotates integrally with the rotary shaft 13. At this time, the Hall Effect IC 62 detects changes in the magnetic field by the rotation of the sensor magnet 17.

Figure 4A:
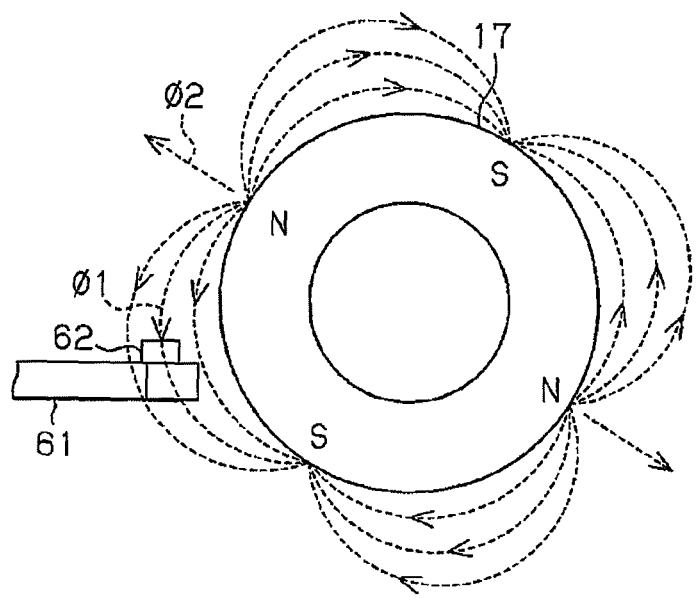
FIG. 4(*a*) is an explanatory diagram illustrating how a Hall Effect IC detects rotation.
Figure 4B:
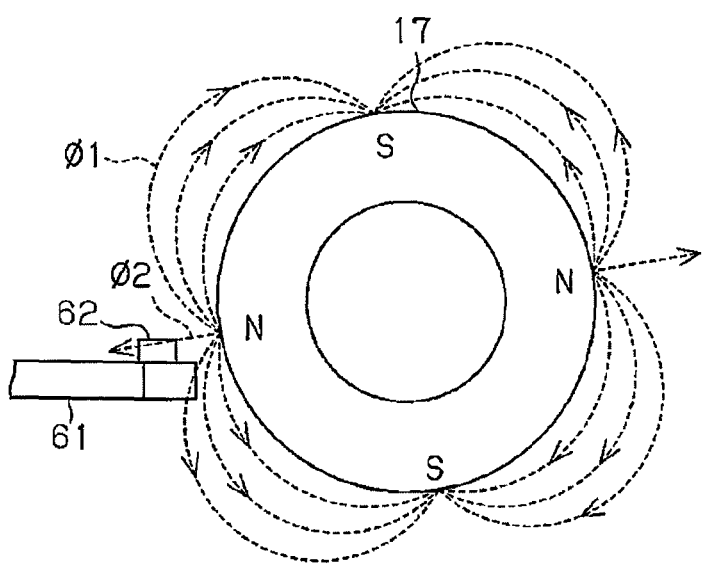

The Hall Effect IC 62 of the present embodiment alternately detects a first magnetic field (vertical magnetic field) vertically entering a surface thereof, i.e., a plane parallel with the surface 61a of the control circuit board 61 and a horizontally entering second magnetic field (horizontal magnetic field). More specifically, as illustrated in FIGS. 4(a) and 4(b), the Hall Effect IC 62 alternately detects a magnetic flux $\phi 1$ (vertical magnetic field) substantially in the circumferential direction of the sensor magnet 17 and a magnetic flux $\phi 2$ (magnetic flux at the magnetic pole center of the sensor magnet 17, horizontal magnetic field) in the radial direction of the sensor magnet 17. Next, the Hall Effect IC 62 outputs two-phase pulse signals based on the detected magnetic fluxes $\phi 1$ and $\phi 2$ to the control circuit 63. When the sensor magnet 17 is rotating, a pulse signal obtained from the magnetic flux $\phi 1$ (first magnetic field) and a pulse signal obtained from the magnetic flux $\phi 2$ (second magnetic field) change at a phase difference of 90 degrees (electric angle) from each other. The control circuit 63 detects rotation information (rotation position (rotation angle), rotation direction and rotation speed) of the sensor magnet 17, i.e., the rotary shaft 13 based on the two-phase pulse signals. The control circuit 63 controls the relay circuit 64 based on the rotation information of the rotary shaft 13, thereby supplying a drive current to the armature 12. Accordingly, a desirable rotation of the armature 12 is realized.

According to the present embodiment, by using the Hall Effect IC 62 capable of detecting the above-described two-phase pulse signals, the flexibility for placement of the Hall Effect IC 62 is improved. Hence, even if the surface of the Hall Effect IC 62 mounted on the control circuit board 61 by the surface-mount technology is substantially orthogonal to the rotation direction of the sensor magnet 17 as in the present embodiment, rotation of the rotary shaft 13 is detectable.

Next, characteristic advantages of the present embodiment will be described below.

(1) The connector module 4 includes the tabular control circuit board 61 provided with the Hall Effect IC 62, which detects rotation of the sensor magnet 17. The axial direction of the worm wheel 49 is defined as the motor short-transverse direction, while a plane orthogonal to the motor short-transverse direction is defined as a motor flat plane (imaginary plane). As illustrated in FIG. 3, the first and second imaginary planes P1 and P2 are parallel with the motor flat plane, and contact both ends of the sensor magnet 17 in the motor short-transverse direction. The control circuit board 61 is arranged to be parallel with the motor flat plane, and is provided between the first and second imaginary planes P1 and P2. That is, the control circuit board 61 is arranged in parallel with the motor flat plane between the first imaginary plane and the second imaginary plane P2 parallel with the motor flat plane and holding the sensor magnet 17 therebetween. Accordingly, since the control circuit board 61 is within the width of the sensor magnet 17 in the motor short-transverse direction, the motor 1 has a reduced thickness.

Since the control circuit board 61 is arranged in parallel with the motor flat plane between the first and second imaginary planes P1 and P2, the extended board portion 61b, on which the Hall Effect IC 62 is arranged, can be shortened in the motor long-transverse direction. Accordingly, vibration of the control circuit board 61 (extended board portion 61b) originating from vibration of the motor 1 is suppressed. As a result, reduction of the rotation detection precision of the Hall Effect IC 62 due to a vibration is suppressed.

According to the first embodiment, the Hall Effect IC 62 is provided between the first and second imaginary planes P1 and P2, and thus the Hall Effect IC 62 is within the width of the sensor magnet 17 in the motor short-transverse direction. Accordingly, the motor 1 has a further reduced thickness.

(2) The control circuit board 61 is provided at a position shifted in the motor short-transverse direction relative to the imaginary straight line L2 in parallel with the motor flat plane and orthogonal to the axis L1 of the rotary shaft 13. The Hall Effect IC 62 is provided on a surface of the control circuit board 61 facing the imaginary straight line L2, i.e., the surface 61a. Accordingly, the Hall Effect IC 62 can be made further closer to the sensor magnet 17, and thus the Hall Effect IC 62 is allowed to readily detect magnetic flux from the sensor magnet 17.

(3) The Hall Effect IC 62 is mounted on the control circuit board 61 by the surface-mount technology. This contributes to space saving.

The embodiment of this disclosure may be modified as follows.

In the first embodiment, a pulse width modulation circuit (PWM circuit) for controlling a rotation speed is not particularly mentioned. However, the embodiment may employ a structure in which a PWM circuit is provided on the control circuit board 61, and the pulse width of the drive current supplied to the armature 12 is changed by the PWM circuit, thereby controlling the rotation speed of the rotary shaft 13.

Figure 5:
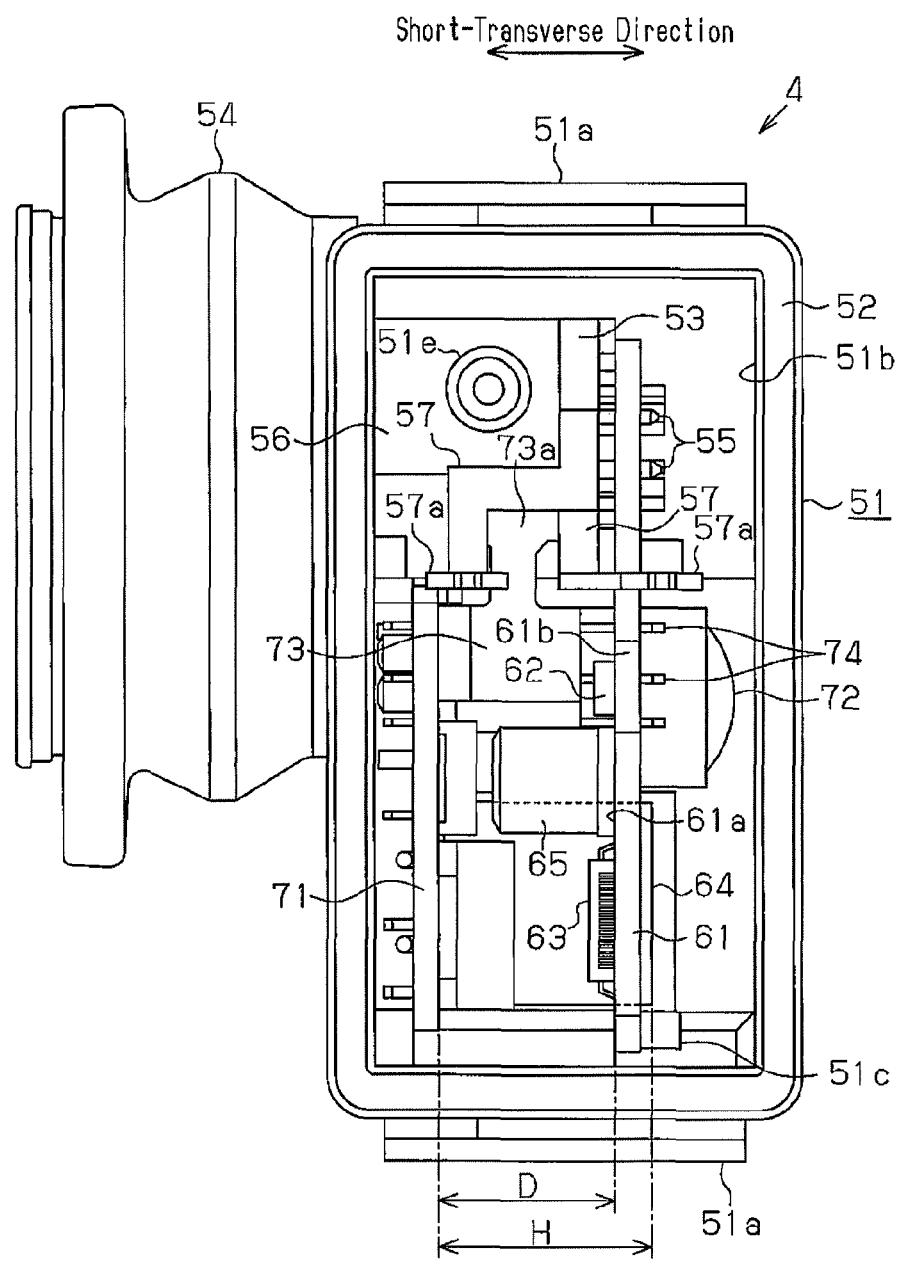
FIG. 5 is a side view illustrating a connector module according to a modification as viewed from a motor long-transverse direction.
Figure 6:
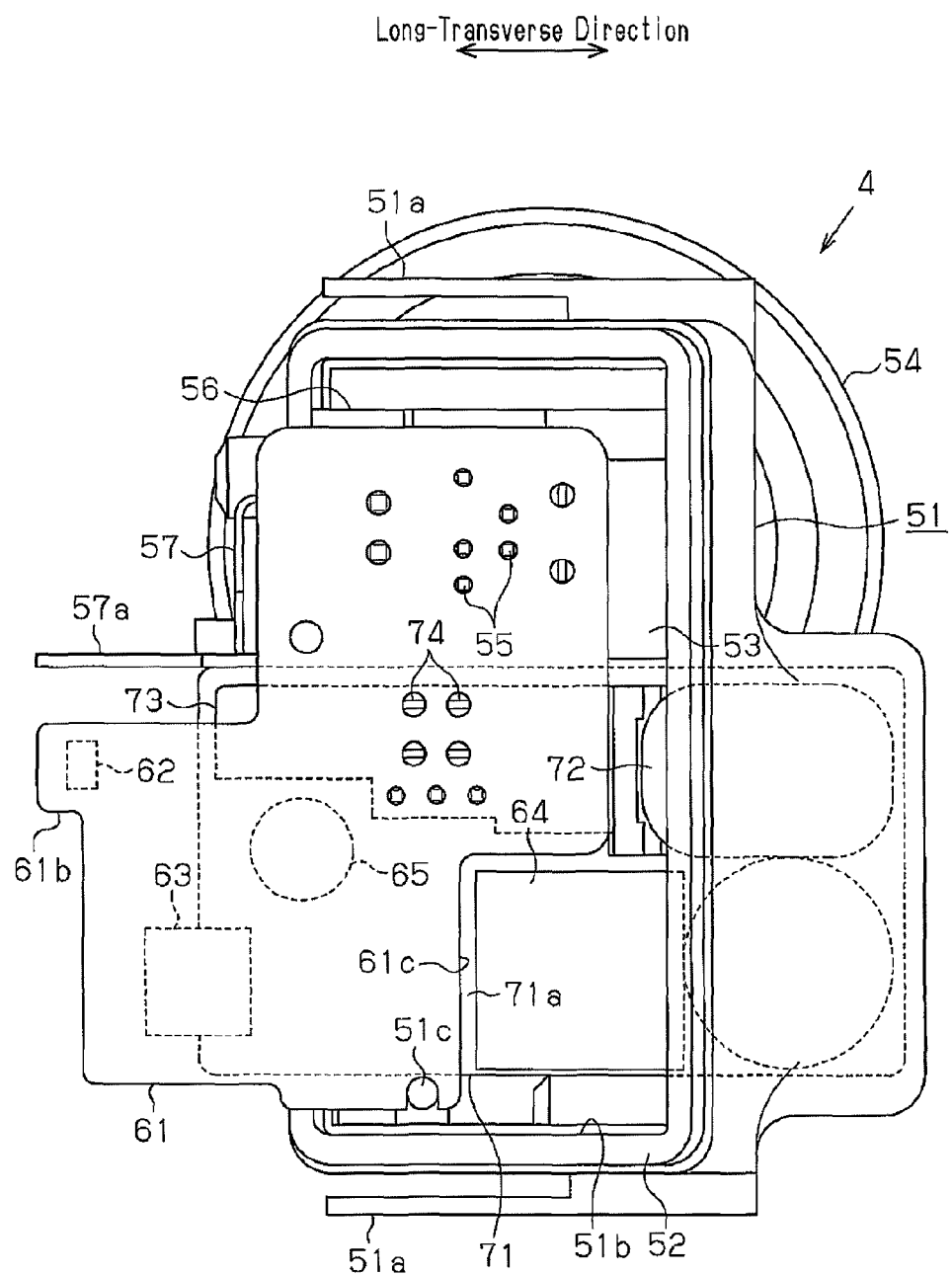
FIG. 6 is a side view illustrating a connector module in FIG. 5 as viewed from a motor short-transverse direction.
Figure 7:
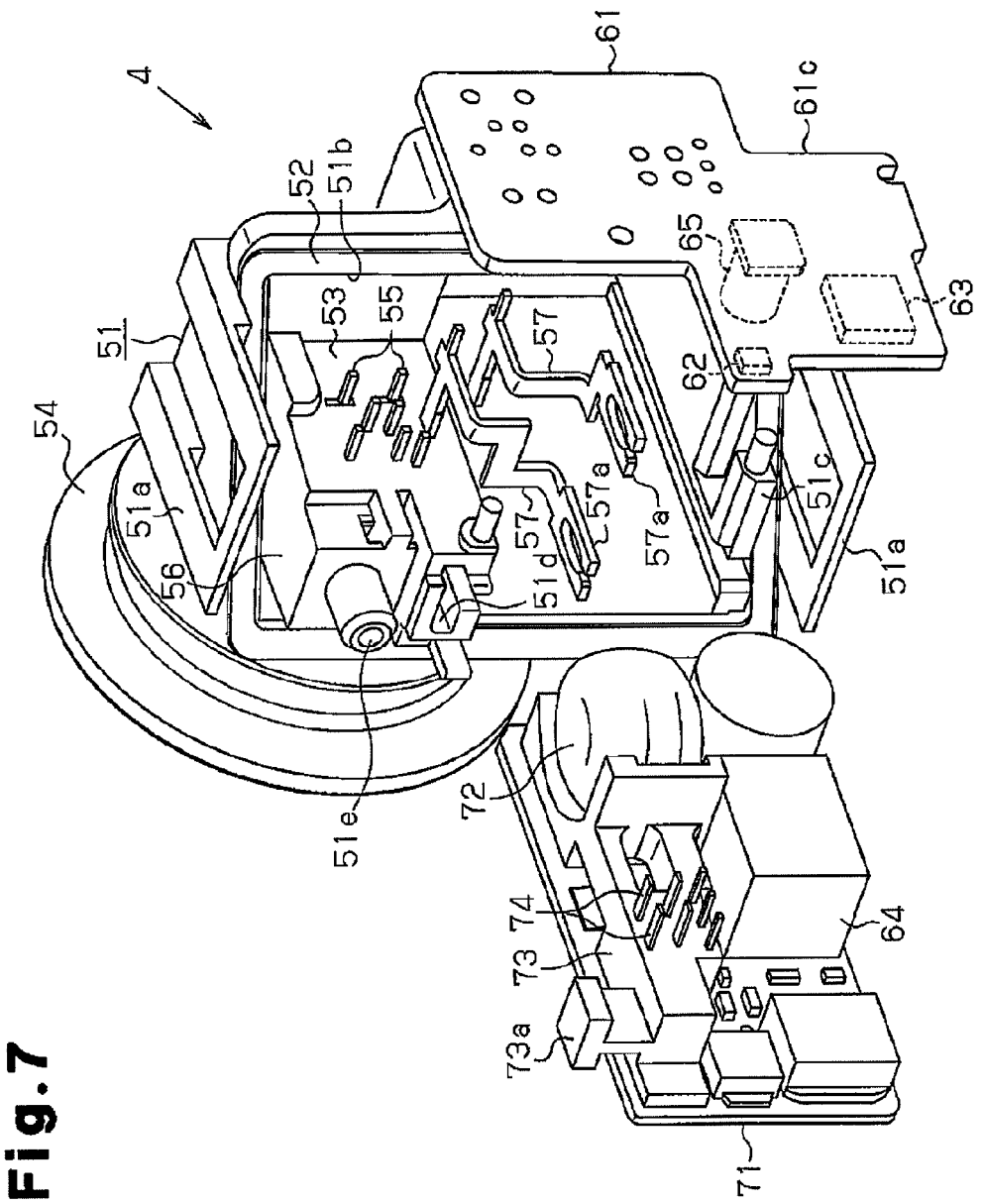
FIG. 7 is an exploded perspective view illustrating the connector module in FIG. 5.

According to another modification, as illustrated in FIGS. 5 to 7, a second board 71 separated from the control circuit board 61 as a first board may be provided in the connector module 4, and a PWM circuit may be built in the control circuit 63. The structure illustrated in FIGS. 5 to 7 includes modifications in the circuit structure including boards and the shape of the connector housing 51 to retain the two boards with respect to those of the first embodiment. Other structures, however, such as the terminal holder 56, the press-fit portion 51e formed on the terminal holder 56, and each connector-side terminal 57 held by the terminal holder 56, are the same as those of the first embodiment.

As illustrated in FIG. 5, the second board 71 accommodated in the connector housing 51 together with the control circuit board 61 is parallel with the motor flat plane (a plane orthogonal to the motor short-transverse direction). That is, the second board 71 is parallel with the control circuit board 61, and is arranged to face the control circuit board 61 in the motor short-transverse direction. The second board 71 is located between the control circuit board 61 and the connector boot 54.

As illustrated in FIG. 7, a plastic connection member 73 is provided on the second board 71. An attaching portion 73a is formed with the connection member 73. The attaching portion 73a is engaged with an engagement recess 51d formed in the connector housing 51. Accordingly, the second board 71 is fastened to the connector housing 51. The connection member 73 accommodates a choke coil 72, which is a noise eliminator.

As illustrated in FIGS. 5 and 7, connection terminals 74 are provided on the connection member 73. The connection terminals 74 are connected to the control circuit board 61. The control circuit board 61 and the second board 71 are electrically connected with each other through the connection terminals 74.

Unlike the first embodiment, the relay circuit 64 is provided on the second board 71. The relay circuit 64 is provided on a surface of the second board 71 facing the control circuit board 61, and is provided at a position not facing the control circuit board 61 in the motor short-transverse direction. As illustrated in FIG. 5, the relay circuit 64 has a height dimension H (a dimension in the motor short-transverse direction) set to be larger than a clearance D between the control circuit board 61 and the second board 71 in the motor short-transverse direction. That is, the relay circuit 64 is set to have a height over the control circuit board 61, and has an upper end (an end in the motor short-transverse direction) located at the opposite side to the second board over the control circuit board 61. Likewise, the choke coil 72 has a height dimension set to be larger than the clearance D between the control circuit board 61 and the second board 71, and an upper end of the choke coil 72 is located at the opposite side to the second board over the control circuit board 61. That is, both upper end of the relay circuit 64 and upper end of the choke coil 72 protrude from the control circuit board 61.

As illustrated in FIGS. 6 and 7, a cutout 61c corresponding to the external shape of the relay circuit 64 is formed in the control circuit board 61. This cutout 61c suppresses interference between the control circuit board 61 and the relay circuit 64.

According to the above-described structure, the control circuit 63 controls the relay circuit 64 based on rotation information of the rotary shaft 13, thereby supplying a drive current to the armature 12, and causes the PWM circuit to change the pulse width of the drive current, thereby controlling the rotation speed of the rotary shaft 13.

According to the structure illustrated in FIGS. 5 to 7, the control circuit 63 and the relay circuit 64 are provided on separate boards (the control circuit board 61 and the second board 71), and thus the planar area of each board 61, 71 is reduced. Since the two boards 61 and 71 are arranged to face each other, an increase in size of the connector module 4 in the direction of the plane of the board is suppressed.

Moreover, the clearance D between the control circuit board 61 and the second board 71 in the motor short-transverse direction is set to be smaller than the height dimension H of the relay circuit 64. Accordingly, the space for the control circuit board 61 and the second board 71 (including the relay circuit 64) in the motor short-transverse direction can be minimized. Hence, an increase in size in the motor short-transverse direction is suppressed although a structure in which the two boards 61 and 71 are arranged side by side in the motor short-transverse direction is employed.

According to the first embodiment, only one Hall Effect IC 62, which detects the vertical magnetic field and the horizontal magnetic field and outputs two-phase pulse signals, is provided. However, the embodiment is not particularly limited to this structure. For example, a structure may be employed in which a plurality of general Hall Effect ICs, which detect only magnetic fields vertically entering the surface, are provided and each Hall Effect IC outputs a pulse signal to the control circuit 63.

In the first embodiment, the mount surface (the surface 61a) of the control circuit board 61, on which the Hall Effect IC 62 is mounted, is located between the first and second imaginary planes P1 and P2. In addition to such a structure, for example, the embodiment may employ a structure in which the mount surface (the surface 61a) of the control circuit board 61 is located on the first or second imaginary plane P1 or P2.

In the first embodiment, the Hall Effect IC 62 is mounted on the control circuit board 61 by the surface-mount technology. In addition to such a structure, the embodiment may employ a structure in which, for example, the Hall Effect IC 62 is spaced apart from the surface 61a of the control circuit board 61, and a terminal extending from the Hall Effect IC 62 is welded and connected to the control circuit board 61. The Hall Effect IC 62 may be attached to the edge portion of a tip or the like of the extended board portion 61b of the control circuit board 61 directly or via a holder member.

According to the first embodiment, the Hall Effect IC 62 is provided on the surface 61a of the control circuit board 61. However, the Hall Effect IC 62 may be provided on the back surface (the surface facing the second imaginary plane P2) of the control circuit board 61.

According to the first embodiment, an edge (a tip of the extended board portion 61b) of the control circuit board 61 is arranged to face the outer circumference of the sensor magnet 17 in the motor long-transverse direction, and the sensor magnet 17 and the Hall Effect IC 62 are located on the same straight line extending in the motor long-transverse direction. However, the embodiment is not particularly limited to this structure. For example, the extended board portion 61b may be located above or below the sensor magnet 17 in the motor axial direction, and the sensor magnet 17 and the Hall Effect IC 62 may be located on the same straight line extending in the motor axial direction.

According to the first embodiment, the control circuit board 61 is arranged in parallel with the motor flat plane. The embodiment is, however, not particularly limited to this structure. As long as a structure is employed in which the control circuit board 61 is located in between the first and second imaginary planes P1 and P2, the control circuit board 61 may be inclined relative to the motor flat plane. This structure also brings about the same advantages described in the above embodiment.

Figure 8:
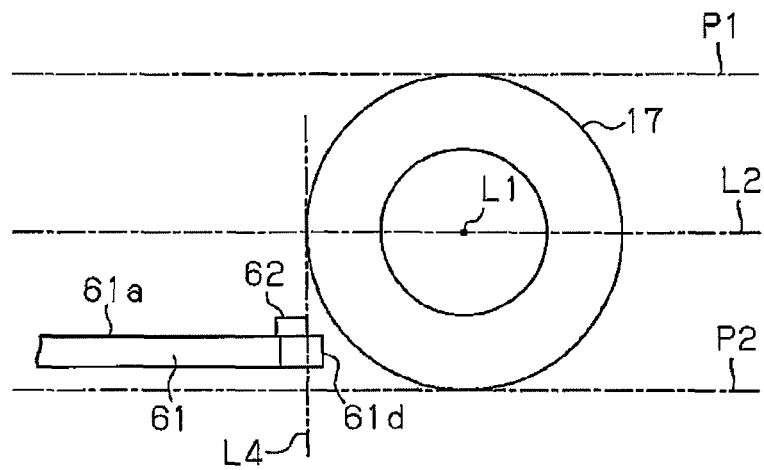
FIG. 8 is an explanatory diagram illustrating a board layout structure according to a modification.

The control circuit board 61 may be arranged as illustrated in FIG. 8. According to the structure illustrated in FIG. 8, like the first embodiment, the control circuit board 61 is provided between the first and second imaginary planes P1 and P2. A tangent line L4 of the sensor magnet is also a tangent line of the outer circumference of the sensor magnet 17 orthogonal to both first and second imaginary planes P1 and P2. Furthermore, in FIG. 8, the tip of the control circuit board 61, i.e., a magnet-side end 61d is located on a side of the sensor magnet tangent line L4 that corresponds to the sensor-magnet-17 (the right side as viewed in FIG. 8). Accordingly, the control circuit board 61 is fitted in between the first and second imaginary planes P1 and P2 to reduce the size of the motor 1 in the short-transverse direction. At the same time, the control circuit board 61 may be arranged at a location further close to the sensor magnet 17. As a result, the distance between the Hall Effect IC 62 mounted on the control circuit board 61 by the surface-mount technology and the sensor magnet 17 is reduced. By causing the Hall Effect IC 62 to be closer to the sensor magnet 17, magnetic force by the sensor magnet 17 can be suppressed without deteriorating the rotation detection performance, and the present embodiment contributes to a cost reduction.

Figure 9:
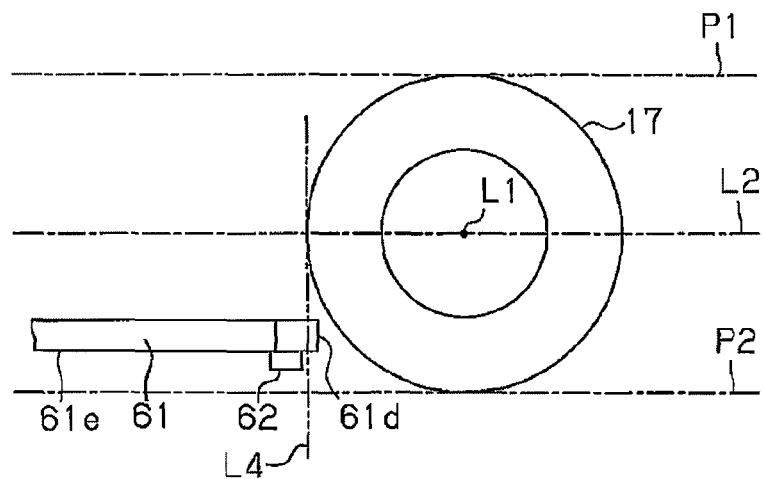
FIG. 9 is an explanatory diagram illustrating a board layout structure according to another modification.

According to the structure illustrated in FIG. 8, the Hall Effect IC 62 is provided on the surface 61a (the surface facing the imaginary straight line L2) of the control circuit board 61. Alternatively, as illustrated in FIG. 9, the Hall Effect IC 62 may be provided on a surface 61e of the control circuit board 61 that faces the second imaginary plane P2.

In the first embodiment, the relay circuit 64 as a switch circuit that generates a drive current to be supplied to the motor unit 2 is used. Instead of the relay circuit, for example, a semiconductor switch may be used.

In the first embodiment, the press-fit portion 51e of the connector module 4 has a protruding shape and a press-fit counterpart portion of the gear housing 41 is the press-fit hole 41a. Conversely, the press-fit portion of the connector module 4 may have a recessed shape and the press-fit counterpart portion of the gear housing 41 may have a protruding shape.

In the first embodiment, a connection structure is employed in which the branched portion 57a is formed at the connector-side terminal 57, and the power feeding terminal 34 is held between the pieces of the branched portion 57a. Conversely, the embodiment may employ a connection structure in which the branched portion may be formed at the power feeding terminal 34, and the connector-side terminal 57 may be held between the pieces of the branched portion.

In the first embodiment, the connector module 4 is assembled with the gear housing 41 in the direction orthogonal to the axial direction (motor long-transverse direction). In addition to such a structure, for example, the embodiment may employ a structure in which the connector module 4 is assembled in the motor axial direction.

In the first embodiment, the present disclosure is applied to the motor 1 used as a drive source of a power window device. The present disclosure may be applied to a motor used as a drive source for other devices than the power window device, such as a vehicular wiper device.

Second Embodiment

A second embodiment of the present disclosure will now be described with reference to FIGS. 10 to 13. Like or the same reference numerals are given to those components that are like or the same as the corresponding components described above.

Figure 10:
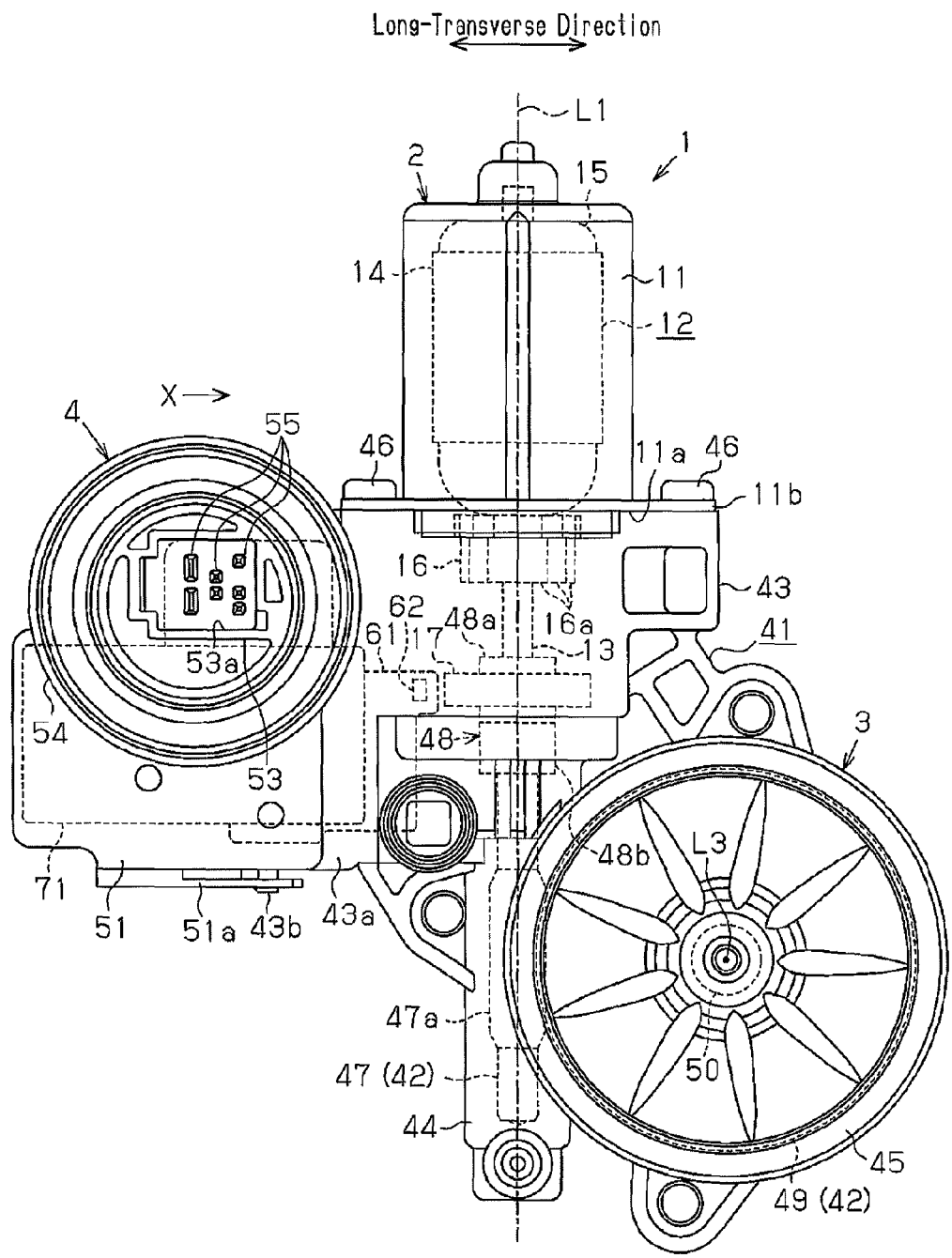
FIG. 10 is a front view illustrating a motor according to a second embodiment.
Figure 11:
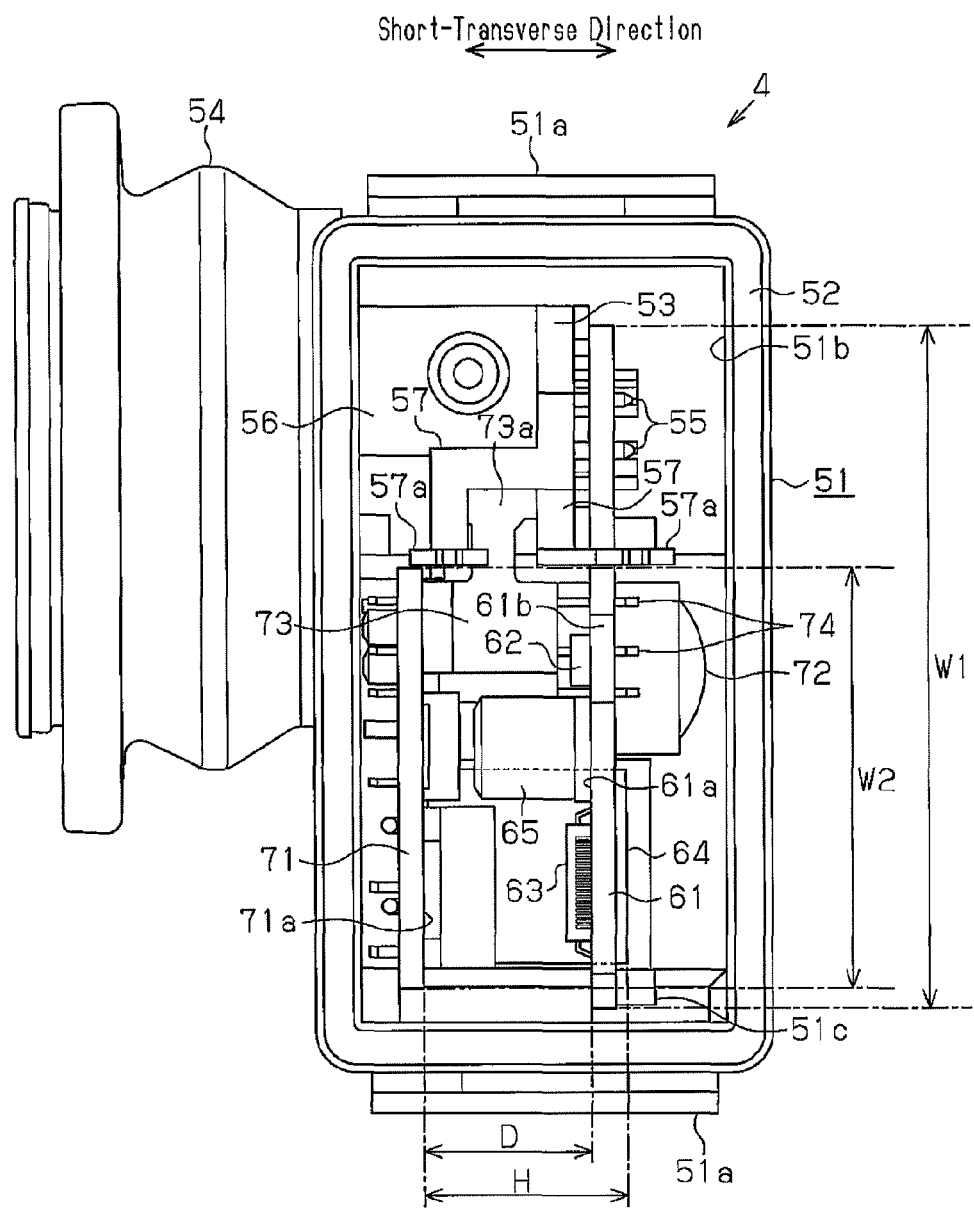
FIG. 11 is a side view illustrating a connector module in FIG. 10 as viewed from a motor long-transverse direction.
Figure 12:
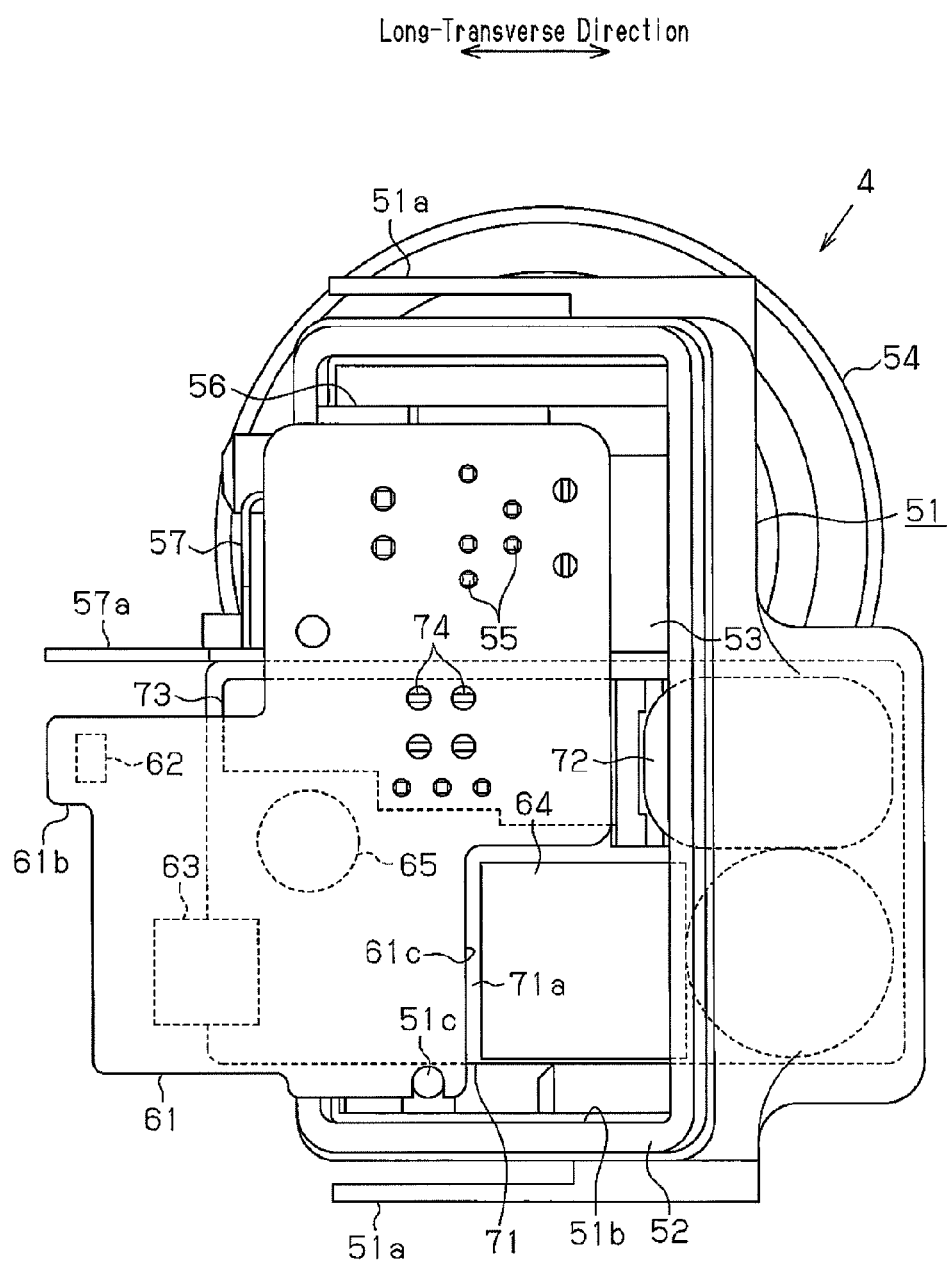
FIG. 12 is a back view illustrating the connector module in FIG. 10 as viewed from a motor short-transverse direction.

As illustrated in FIGS. 10 and 11, the connector housing 51 is provided with the first board 61 and the second board 71 each in a planar shape. As illustrated in FIGS. 11 and 12, the first board 61 as the control circuit board and the second board 71 are arranged to be parallel with each other and to be orthogonal to the motor short-transverse direction (i.e., parallel with the flat plane of the motor 1). That is, the first board 61 and the second board 71 are arranged to face each other in the motor short-transverse direction. The first board 61 and the second board 71 are provided in the connector housing 51 such that respective portions protrude from the opening 51b. The first board 61 and the second board 71 construct a control circuit member.

A positioning member 51c extending in the motor short-transverse direction is formed at the connector housing 51. The position of the first board 61 in the short-transverse, axial, and long-transverse directions of the motor 1 is determined by the positioning member 51c. The first board 61 is arranged to face the sensor magnet 17 in the motor long-transverse direction. The first board 61 is provided at a position shifted in the motor short-transverse direction (offset position) relative to the imaginary straight line L2 (see FIG. 3) parallel with the motor long-transverse direction and orthogonal to the axis L1 of the rotary shaft 13. The second board 71 is arranged on a side of the first board 61 that corresponds to the connector boot 54, while the second board 71 is located in a space formed below the external connection portion 53 in the axial direction.

As illustrated in FIG. 11, the first board 61 and the second board 71 are arranged such that respective surfaces are parallel with the height direction of the connector housing 51 (a direction consistent with the direction of the axis L1, or the vertical direction as viewed in FIG. 11). The first board 61 and the second board 71 are structured such that a width W2 of the second board 71 in the height direction of the connector housing 51 is within a width W1 of the first board 61 in the height direction as viewed in the attaching direction X (direction orthogonal to the sheet of FIG. 11) of the connector module 4. Accordingly, even if the dimension of the connector housing 51 (opening 51b) in the height direction is designed to be small in accordance with the width W1 of the first board 61 without taking the width W2 of the second board 71 into consideration, the first and second boards 61 and 71 can be arranged in the connector housing 51.

As illustrated in FIG. 10, a part of the first board 61 extends toward a side of the external connection portion 53 in the motor short-transverse direction. The connector terminals 55 are embedded in the external connection portion 53 by insert molding. Each connector terminal 55 has a first end connected to the first board 61, and has a second end protruding in the internal space of the receptacle 53a of the external connection portion 53. The second end of each connector terminal 55 is connected to the external connector to be plugged in the receptacle 53a. Inputting and outputting of electric signals relative to the motor 1 and power supply thereto are performed through this external connector.

Figure 13:
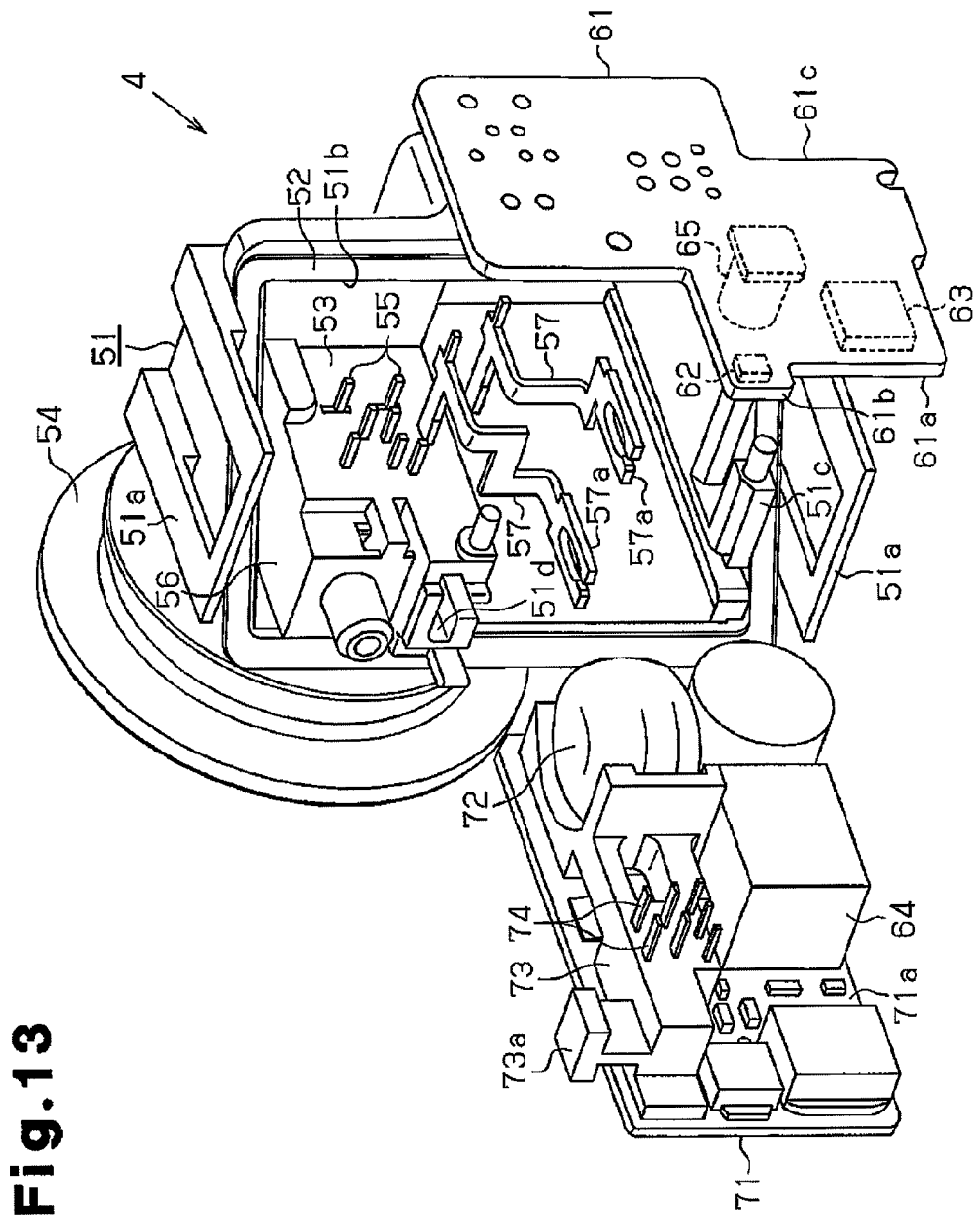
FIG. 13 is an exploded perspective view illustrating the connector module in FIG. 10.

As illustrated in FIGS. 11 and 13, electrical components, such as the Hall Effect IC 62 as a rotation detecting element, the control circuit 63, and the capacitor 65 as a noise eliminator are mounted on the surface 61a (a surface facing the second board 71) of the first board 61 by the surface-mount technology. A pulse width modulation circuit (PWM circuit) for controlling a rotation speed is built in the control circuit 63. The extended board portion 61b is formed at a portion of the first board 61 that is located at the same position as that of the sensor magnet 17 in the motor axial direction. The extended board portion 61b extends toward the sensor magnet 17 in the motor long-transverse direction, and a tip of the extended board portion 61b faces the outer circumference of the sensor magnet 17 in the motor long-transverse direction. The Hall Effect IC 62 is provided on the extended board portion 61b. That is, the extended board portion 61b is a portion that protrudes to arrange the Hall Effect IC 62 near the sensor magnet 17.

As illustrated in FIG. 10, the Hall Effect IC 62 is provided at the same position as that of the sensor magnet 17 in the motor axial direction. As illustrated in FIGS. 11 and 13, the Hall Effect IC 62 is mounted on the surface 61a of the first board 61. The Hall Effect IC 62 has a surface (a surface parallel with the surface 61a of the first board 61) is substantially orthogonal to the rotation direction of the rotary shaft 13.

As illustrated in FIGS. 11 to 13, electrical components, such as a connection member 73, the choke coil 72 as a noise eliminator, and the relay circuit 64, are provided on a surface 71a (a surface facing the first board 61) of the second board 71.

The connection member 73 is formed of plastic. The attaching portion 73a is formed with the connection member 73. The attaching portion 73a is engaged with the engagement recess 51d (see FIG. 13) formed in the connector housing 51. Accordingly, the second board 71 is fastened with the connector housing 51.

The connection member 73 has the choke coil 72 as a noise eliminator. The connection terminals 74 are provided in the connection member 73. The connection terminals 74 are connected with the first board 61. The first board 61 and the second board 71 are electrically connected to each other via the connection terminals 74.

As illustrated in FIGS. 11 and 12, each electrical component provided on the surface 61a of the first board 61 and each electrical component provided on the surface 71a of the second board 71 are arranged in an offset manner not to interfere with each other in the board planar direction (the direction of the sheet of FIG. 12).

More specifically, in a portion where the first board 61 and the second board 71 overlap with each other in the motor short-transverse direction (direction orthogonal to the sheet of FIG. 12), the control circuit 63 of the first board 61 and the capacitor 65 thereof are located below the connection member 73 of the second board 71 (downward the connection member 73 in FIG. 12). Accordingly, the control circuit 63 and the capacitor 65 do not interfere with the connection member 73.

The extended board portion 61b of the first board 61 does not face the second board 71 in the motor short-transverse direction (direction orthogonal to the sheet in FIG. 12), and thus the Hall Effect IC 62 mounted on the extended board portion 61b is shifted relative to the electrical component of the second board 71 in the board planar direction (direction of sheet of FIG. 12).

A portion of the second board 71 where the choke coil 72 is provided does not face the first board 61 in the motor short-transverse direction, and thus the choke coil 72 is shifted relative to the electrical component of the first board 61 in the board planar direction. The choke coil 72 has a large height dimension (a dimension in the direction orthogonal to the board (motor short-transverse direction)). The height dimension is set to be larger than the clearance D between the first board 61 and the second board 71 in the motor short-transverse direction. That is, as illustrated in FIG. 11, the choke coil 72 has an upper end located on the back side of the first board 61 (a side opposite to the second board).

The relay circuit 64 of the second board 71 is likewise has a height dimension H set to be larger than the clearance D between the first board 61 and the second board 71. As illustrated in FIGS. 12 and 13, in the first board 61, the cutout 61c corresponding to the external shape of the relay circuit 64 is formed at a position facing the relay circuit 64 in the motor short-transverse direction. The relay circuit 64 is fitted in the cutout 61c of the first board 61. As illustrated in FIG. 11, the relay circuit 64 has an upper end located on the back side of the first board 61. That is, this cutout 61c prevents interference between the first board 61 and the relay circuit 64.

Next, operation of the present embodiment will be described.

When power is supplied to the armature 12 through the external connector plugged in the receptacle 53a of the external connection portion 53, and the armature 12 (rotary shaft 13) is rotated, the sensor magnet 17 rotates integrally with the rotary shaft 13. At this time, the Hall Effect IC 62 detects changes in the magnetic field due to the rotation of the sensor magnet 17.

The Hall Effect IC 62 of the present embodiment alternately detects a first magnetic field (vertical magnetic field) vertically entering a plane parallel with the surface 61a of the first board 61, and a horizontally entering second magnetic field (horizontal magnetic field), and generates respective pulse signals based on the magnetic fields. Next, the Hall Effect IC 62 outputs two-phase pulse signals to the control circuit 63. When the sensor magnet 17 is rotating, a pulse signal obtained based on the first magnetic field and a pulse signal obtained based on the second magnetic field changes at a phase difference of 90 degrees (electric angle) from each other. The control circuit 63 detects rotation information (e.g., a rotation position (rotation angle), a rotation direction, and a rotation speed) of the sensor magnet 17 (the rotary shaft 13) based on the two-phase pulse signals. The control circuit 63 controls the relay circuit 64 based on the rotation information of the rotary shaft 13, thereby supplying a drive current to the armature 12. Accordingly, a desired rotation of the armature 12 is realized.

According to the present embodiment, the use of the Hall Effect IC 62, which can detect the above-described two-phase pulse signals, improves the flexibility for placement of the Hall Effect IC 62. Accordingly, although the surface of the Hall Effect IC 62 mounted on the first board 61 by the surface-mount technology is substantially orthogonal to the rotation direction of the sensor magnet 17 as in the present embodiment, the rotation of the rotary shaft 13 is detectable.

According to the present embodiment, the control circuit 63 controls the relay circuit 64 based on the rotation information of the rotary shaft 13 to supply the drive current to the armature 12, and controls the PWM circuit to cause the PWM circuit to change the pulse width of the drive current, thereby controlling the rotation speed of the rotary shaft 13.

The relay circuit 64 is provided on the second board 71, and the control circuit 63 is provided on the first board 61. Accordingly, in comparison with a structure as a comparative example in which only a board is provided, the area of each board 61, 71 can be reduced, and thus an increase in size of the motor 1 in the board planar direction is suppressed. According to the present embodiment, the clearance D between the first board 61 and the second board 71 is set to be smaller than the height dimension H of the relay circuit 64 and the height dimension of the choke coil 72. Accordingly, the installation space of the first and second boards 61 and 71 in the motor short-transverse direction is minimized. Hence, although a structure is employed in which the two boards 61 and 71 are provided side by side in the motor short-transverse direction, an increase in size of the motor 1 in the motor short-transverse direction is suppressed.

Next, characteristic advantages of the present embodiment will be described.

(4) Respective electrical components are provided on the surface 61*a* of the first board 61 and the surface 71*a* of the second board 71 facing each other. The electric component (the Hall Effect IC 62, the control circuit 63, the capacitor 65, and the like) of the first board 61 and the electrical component (the connection member 73, the choke coil 72, the relay circuit 64, and the like) of the second board 71 are arranged to be shifted in the board planar direction not to interfere with each other. Accordingly, the electrical components can be divided into a group mounted on the first board 61 and a group mounted on the second board 71, and thus the area of each board 61, 71 can be reduced. The motor 1 employs a structure in which the respective electrical components of the boards 61 and 71 do not interfere with each other although the clearance between the first board 61 and the second board 71, which face each other in a surface to surface manner, is reduced. Hence, an increase in size of the motor 1 is suppressed by reducing the clearance between the first and second boards 61 and 71.

(5) The cutout 61*c* (insertion portion), in to which the electrical component (in the present embodiment, the relay circuit 64) provided on the second board 71 is inserted, is formed in the first board 61. Accordingly, the first and second boards 61 and 71 are structured such that the electrical components of the first and second boards 61 and 71 do not interfere with each other while the clearance between the first and second boards 61 and 71 is reduced.

(6) The gear housing 41 is in a flat shape that is thin in the direction of the rotation axis L3 of the worm wheel 49, and the first and second boards 61 and 71 face each other in the direction of the rotation axis L3 of the worm wheel 49. Hence, the first and second boards 61 and 71 are arranged in accordance with the flat shape of the gear housing 41, and thus an increase in size of the gear housing 41 in the motor short-transverse direction is suppressed while ensuring the area of each board 61, 71.

(7) As viewed in the attaching direction X of the connector module 4, the first board 61 and the second board 71 are structured such that the width W2 of the second board 71 in the board planar direction (the height direction of the connector module 4) is within the width W1 of the board planar direction of the first board 61. Accordingly, the dimension of the connector housing 51 in the height direction can be set in accordance with the width W1 of the first board 61 without taking the width W2 of the second board 71 into consideration. Hence, the first and second boards 61 and 71 can be arranged in the connector module 4 while suppressing an increase in size of the connector module 4 in the height direction (motor short-transverse direction, and direction of rotation axis L3).

When a low-cost structure having the second board 71 omitted from the connector module 4 is employed, no wasted space in the height direction (motor short-transverse direction, direction of rotation axis L3) is formed in the connector housing 51. This structure contributes to a space saving in the connector module 4. Moreover, the second board 71 can be added to the low-cost structure without changing the height of the connector housing 51. Accordingly, it is unnecessary to change the structure of the connector attaching portion 43*a* (the gear housing 41) to which the connector housing 51 is attached, contributing to the improvement of the versatility of the gear housing 41.

The second embodiment of the present disclosure may be modified as follows.

In the second embodiment, the insertion portion into which the relay circuit 64 is inserted is the cutout 61*c*. However, an insertion portion into which the relay circuit 64 is inserted may be an insertion hole formed in the first board 61 to pass all the way therethrough.

In the second embodiment, the relay circuit 64 is inserted in the insertion portion (the cutout 61*c*), but the electrical component inserted in the insertion portion is not limited to the relay circuit 64. The motor 1 may employ a structure in which other electrical components are inserted in the insertion portion.

According to the second embodiment, the cutout 61*c* is formed in the first board 61. However, the cutout 61*c* may be formed in the second board 71, and may be formed in both first and second boards 61 and 71.

According to the second embodiment, the first and second boards 61 and 71 are arranged to be parallel with each other, and to intersect the direction of the rotation axis L3 of the worm wheel 49 (motor short-transverse direction) at right angle. The embodiment is not particularly limited to this structure. For example, the first and second boards 61 and 71 may be arranged to intersect the direction of the axis L1 of the rotary shaft 13 or the motor long-transverse direction at right angle. The first board 61 and the second board 71 may be arranged not to be parallel with each other but may be slightly inclined relative to each other.

The structure of the electrical components provided on the respective boards 61 and 71 are not limited to the second embodiments. For example, the structure of the electrical component may be changed in accordance with the structure of the motor 1 as needed.

According to the second embodiment, one Hall Effect IC 62, which detects the vertical magnetic field and the horizontal magnetic field and outputs two-phase pulse signals, is provided. The embodiment is not particularly limited to such a structure. For example, a plurality of general Hall Effect ICs may be provided that detect only magnetic fields vertically entering the surface In this case, each Hall Effect IC outputs a pulse signal to the control circuit 63.

According to the second embodiment, the Hall Effect IC 62 is mounted on the first board 61 by the surface-mount technology. In addition to such a structure, for example, the embodiment may employ a structure in which the Hall Effect IC 62 is spaced apart from the surface 61a of the first board 61, and a terminal extending from the Hall Effect IC 62 is welded and connected to the first board 61.

According to the second embodiment, the edge of the first board 61 (the tip of the extended board portion 61b) is arranged to face the outer circumference of the sensor magnet 17 in the motor long-transverse direction, and the sensor magnet 17 and the Hall Effect IC 62 are located on the same straight line in the motor long-transverse direction. The embodiment is, however, not particularly limited to this structure. For example, a structure may be employed in which the extended board portion 61b is located above or below the sensor magnet 17 in the motor axial direction, and the sensor magnet 17 and the Hall Effect IC 62 are located on the same straight line in the motor axial direction.

According to the second embodiment, the connector module 4 is attached to the gear housing 41 in the direction orthogonal to the axis (motor long-transverse direction). Alternatively, the connector module 4 may be assembled in the motor axial direction.

According to the second embodiment, the present disclosure is applied to the motor 1 used as a drive source for a power window apparatus. The present disclosure is, however, applicable to a motor used as a drive source for other devices than the power window device like a vehicular wiper device.

The invention claimed is:

1. A motor comprising:
a motor unit includes a rotary shaft;
a speed reduction mechanism that includes a worm shaft and a worm wheel, wherein the worm shaft is arranged coaxially with the rotary shaft and is integrally rotational with the rotary shaft, and the worm wheel is meshed with the worm shaft;
a sensor magnet that rotates integrally with the rotary shaft; and
a connector module that includes a connector portion for establishing an electrical connection between the outside and the motor unit and a tabular control circuit board provided with a rotation detecting element that detects rotation of the sensor magnet, wherein
an axial direction of the worm wheel is defined as a motor short-transverse direction,
a plane orthogonal to the motor short-transverse direction is defined as a flat plane of the motor,
the sensor magnet has a first end in the motor short-transverse direction and a second end opposite to the first end,
an imaginary plane contacting the first end and being parallel with the flat plane is defined as a first imaginary plane,
an imaginary plane contacting the second end and being parallel with the flat plane is defined as a second imaginary plane, and
the control circuit board is arranged to be parallel with or inclined relative to the flat plane and is located between the first and second imaginary planes.

2. The motor according to claim 1, wherein the rotation detecting element is located between the first and second imaginary planes.

3. The motor according to claim 1, wherein
the control circuit board is located at a position shifted in the motor short-transverse direction relative to an imaginary straight line that is parallel with the flat plane and intersects an axis of the rotary shaft at right angle, and
the rotation detecting element is located on a side of the control circuit board that faces the imaginary straight line.

4. The motor according to any one of claim 1, wherein the rotation detecting element is mounted on the control circuit board by the surface-mount technology.

5. The motor according to claim 4, wherein
a tangent line of an outer circumference of the sensor magnet orthogonal to both first and second imaginary planes is defined as a sensor magnet tangent line and
when the sensor magnet tangent line traverses the control circuit board as viewed along the axis of the rotary shaft, an end portion of the control circuit board is located on a side of the sensor magnet tangent line that corresponds to the sensor-magnet.

6. The motor according to claim 1, wherein
the connector module includes a second board that is parallel with the control circuit board and faces the control circuit board in the motor short-transverse direction,
the control circuit board and the second board are electrically connected to each other,
the second board has on it a switch circuit that generates a drive current to be supplied to the motor unit, and
the control circuit board has on it a control circuit that controls the switch circuit.

7. The motor according to claim 6, wherein
the switch circuit is a relay circuit, and
a clearance between the control circuit board and the second board in the motor short-transverse direction is set to be smaller than a height dimension of the relay circuit.

8. The motor according to claim 1, wherein
the motor unit further includes:
a gear housing that is assembled with the motor unit and accommodates the speed reduction mechanism, which outputs rotation of the rotary shaft after reducing the speed of the rotation; and
a second board that faces the control circuit board in a surface-to-surface manner and is electrically connected with the control circuit board,
the connector module is attached to the gear housing,
electrical components are provided on the facing surfaces of the control circuit board and the second board, and
the electrical component on the control circuit board and the electrical component on the second board are shifted in a board planar direction so as not to interfere with each other.

9. The motor according to claim 8, wherein
an insertion portion is formed in at least one of the control circuit board and the second board, and
the insertion portion receives in it the electrical component provided on the other board.

10. The motor according to claim 8, wherein
the gear housing has a flat shape that is thin in the motor short-transverse direction, and
the control circuit board and the second board are arranged to face each other in the motor short-transverse direction.

11. The motor according to claim 8, wherein a width of the second board in a board planar direction is within a width of the control circuit board in a board planar direction as viewed in an attaching direction of the connector module.

* * * * *